United States Patent [19]

Decker et al.

[11] Patent Number: 4,759,014
[45] Date of Patent: Jul. 19, 1988

[54] ASYNCHRONOUS-TO-SYNCHRONOUS DIGITAL DATA MULTIPLEXER/DEMULTIPLEXER WITH ASYNCHRONOUS CLOCK REGENERATION

[75] Inventors: David G. Decker, Sunnyvale; Andrew C. Brost, San Jose; Roy I. Vandermolen, Pleasanton, all of Calif.

[73] Assignee: Ampex Corporation, Redwood City, Calif.

[21] Appl. No.: 55,473

[22] Filed: May 28, 1987

[51] Int. Cl.[4] .......................... H04J 3/22; H04J 3/12
[52] U.S. Cl. ................................. 370/84; 370/110.1
[58] Field of Search ............... 370/85, 84, 112, 110.1, 370/68, 68.1; 340/825.5

[56] References Cited

U.S. PATENT DOCUMENTS

| | | | |
|---|---|---|---|
| 4,041,303 | 2/1977 | Vogl | 370/84 |
| 4,181,822 | 1/1980 | Workman | 381/32 |
| 4,222,078 | 9/1980 | Bock | 360/9.1 |
| 4,358,786 | 11/1982 | Pfleiderer | 358/310 |
| 4,499,576 | 2/1985 | Fraser | 370/60 |
| 4,513,328 | 4/1985 | Heitmann | 360/8 |
| 4,549,230 | 10/1985 | Odaka | 360/8 |
| 4,612,636 | 9/1986 | Grover et al. | 370/94 |
| 4,617,658 | 10/1986 | Walters | 370/84 |
| 4,692,894 | 9/1987 | Bemis | 370/84 |

Primary Examiner—Douglas W. Olms
Assistant Examiner—Frank M. Scutch, III
Attorney, Agent, or Firm—Elizabeth E. Strnad; Richard P. Lange

[57] ABSTRACT

Digital data is received on a plurality of input channels at unrelated, asynchronous input clock rates. The data is multiplexed and transmitted via one or more synchronous parallel channels, together with encoded information related to the original asynchronous input clock rate on each channel. The data received from the synchronous channels is demultiplexed and redistributed to proper output channels and clocked out therefrom at rates derived from the encoded and reconstituted asynchronous clock rate information from each channel.

22 Claims, 16 Drawing Sheets

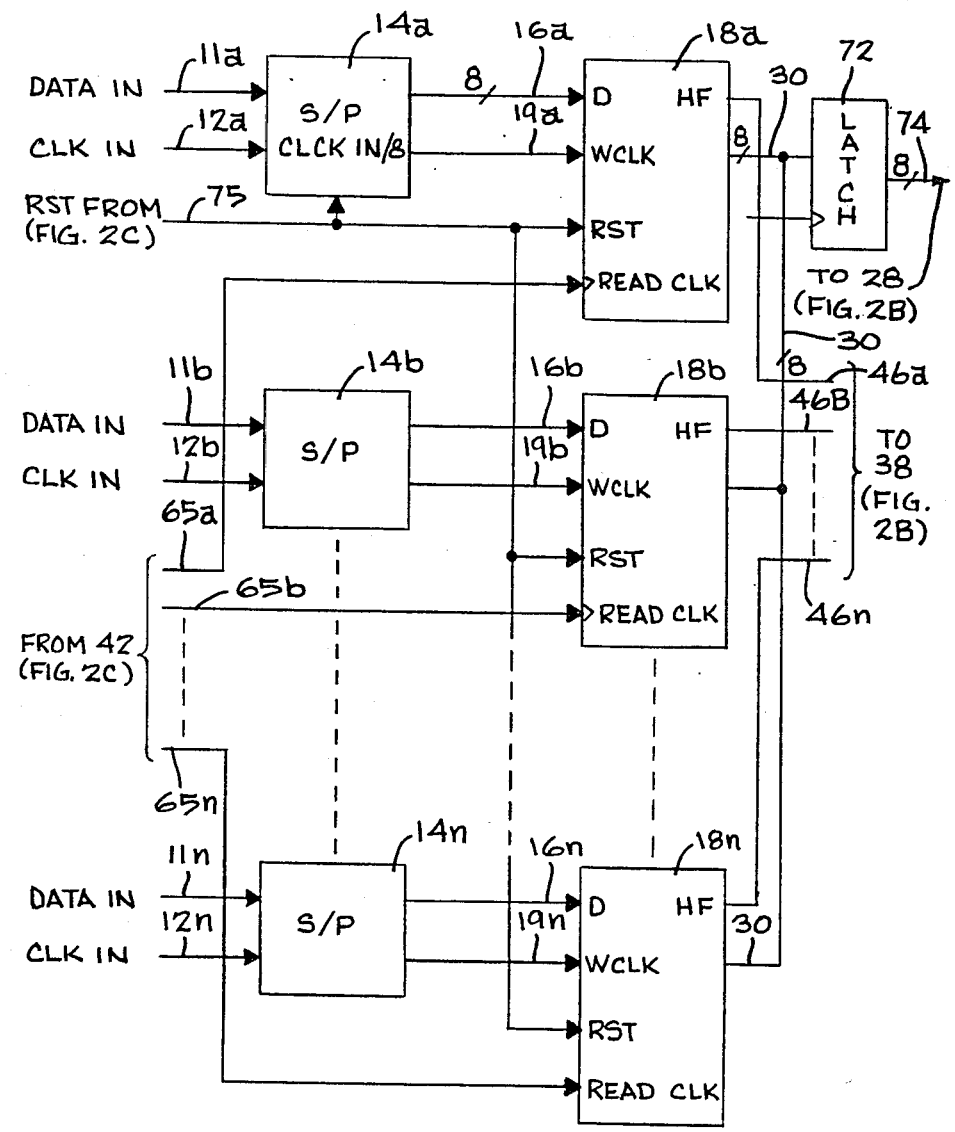
FIG_2A

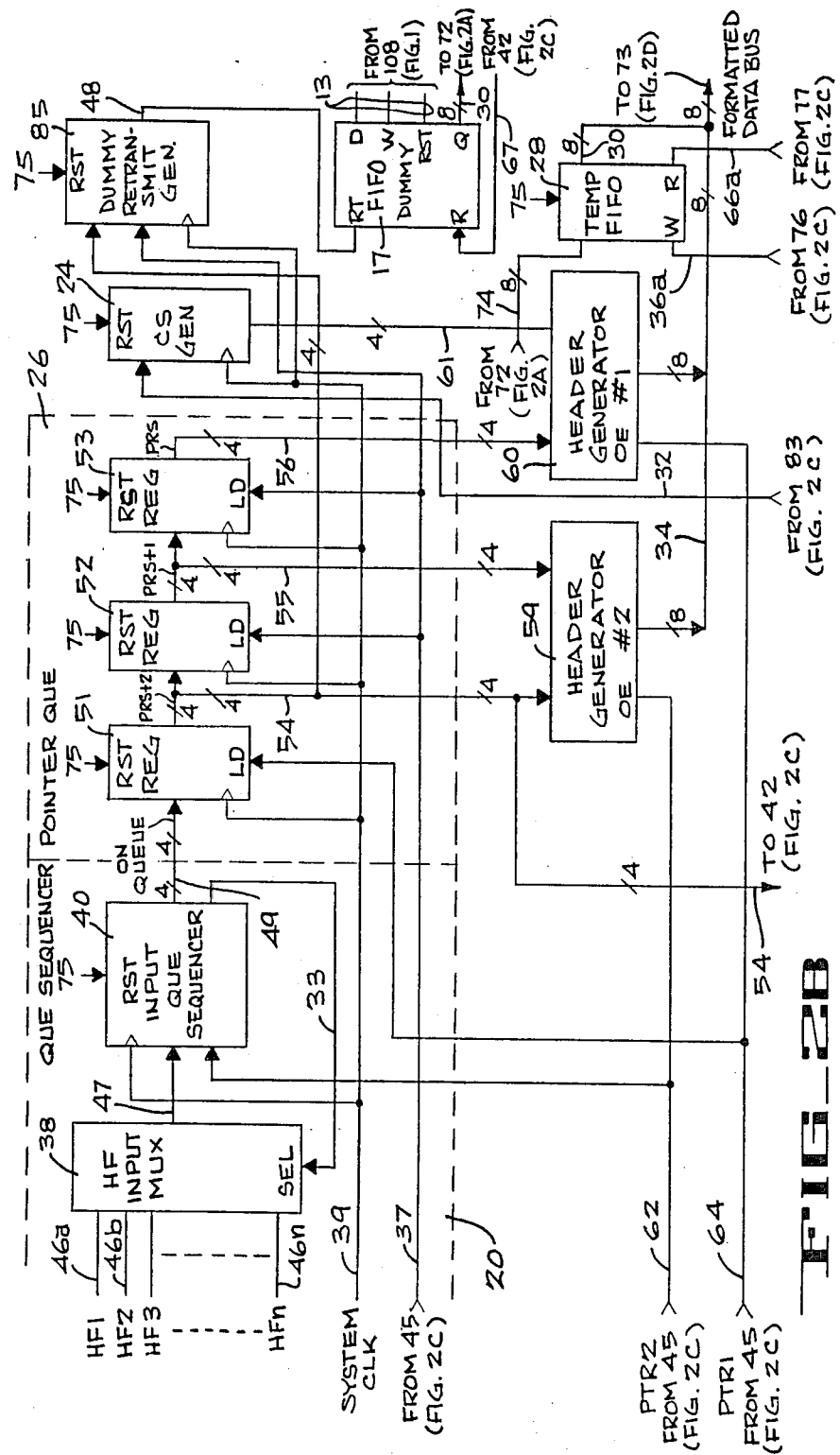

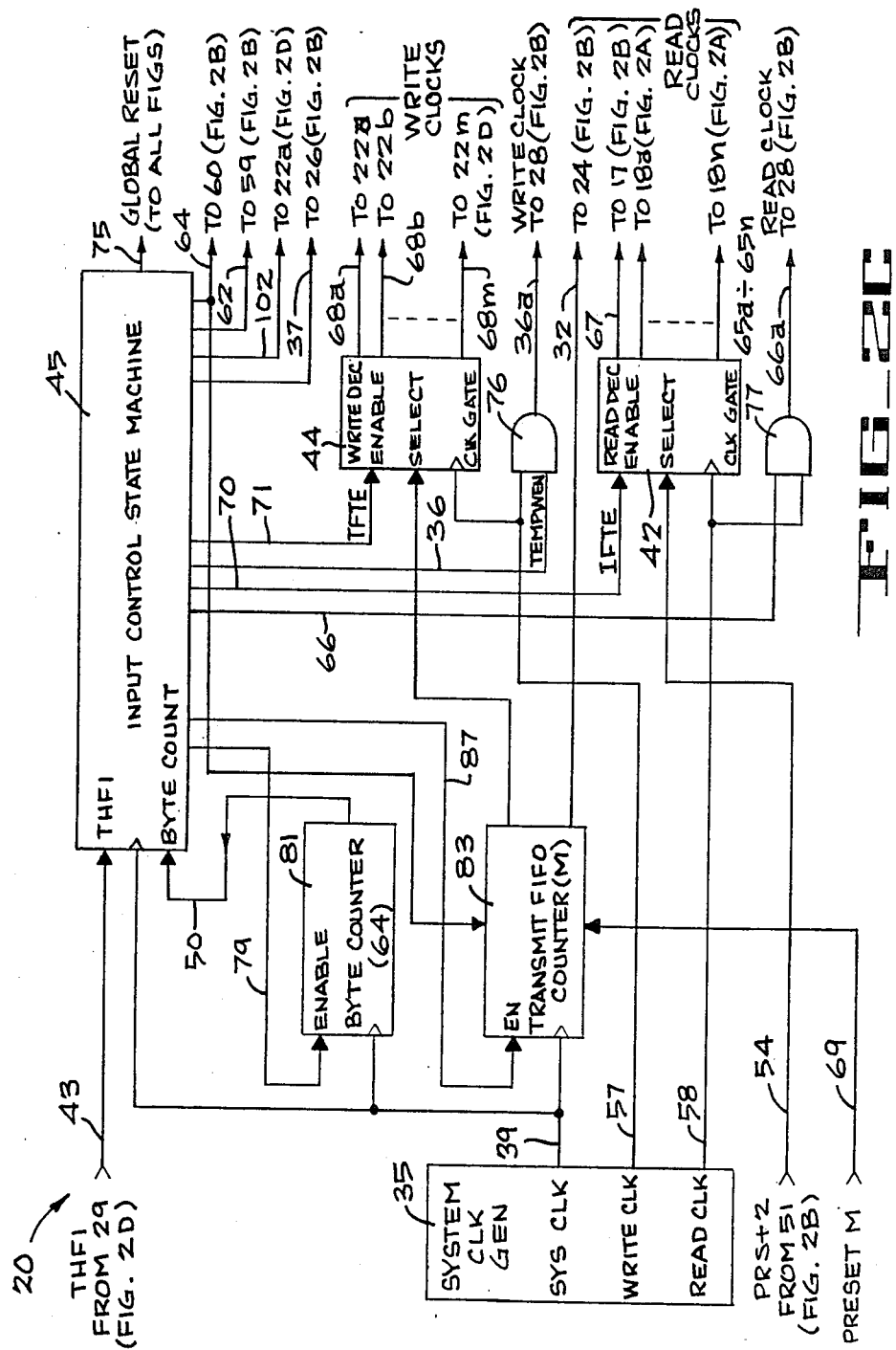

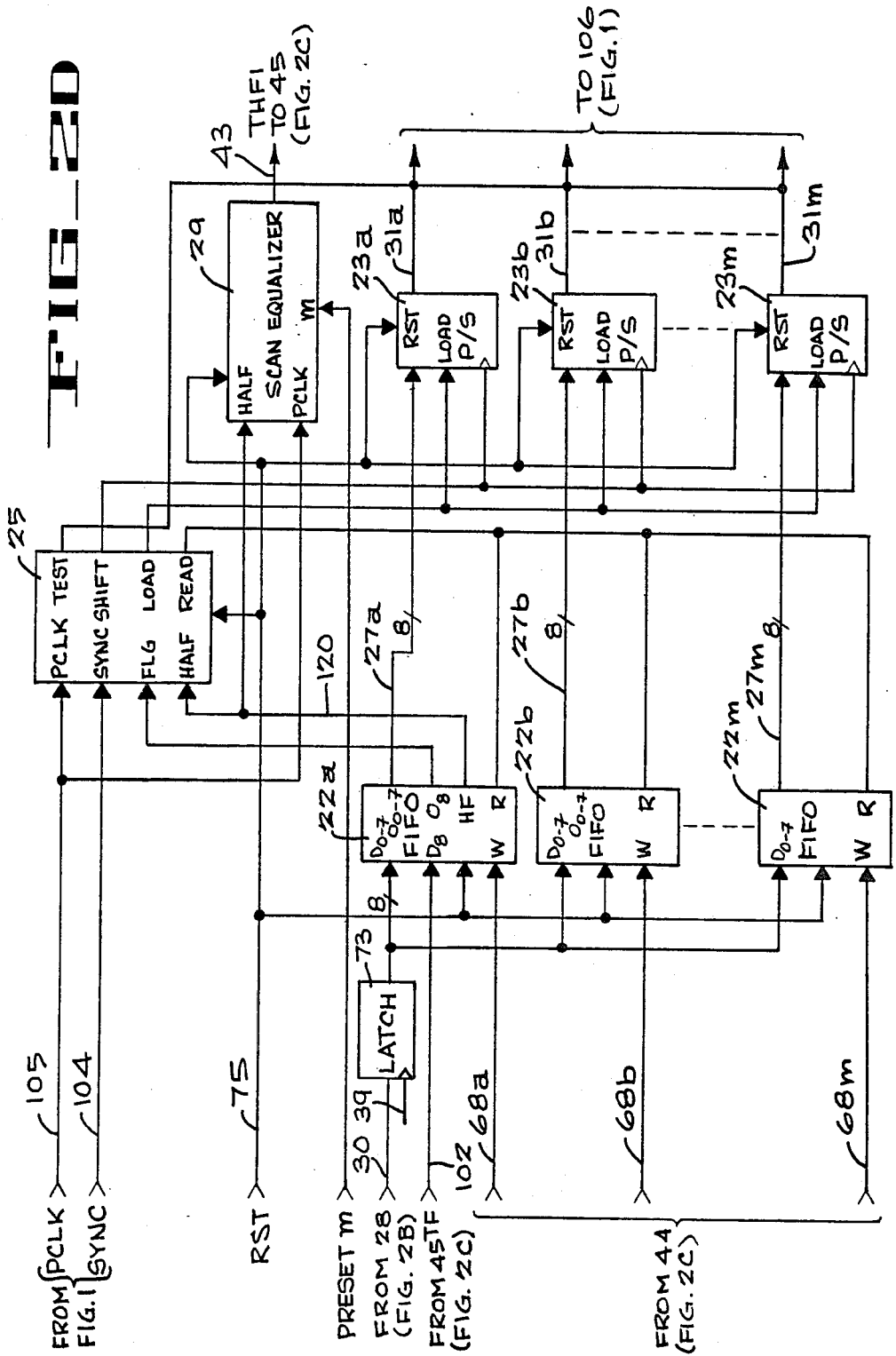

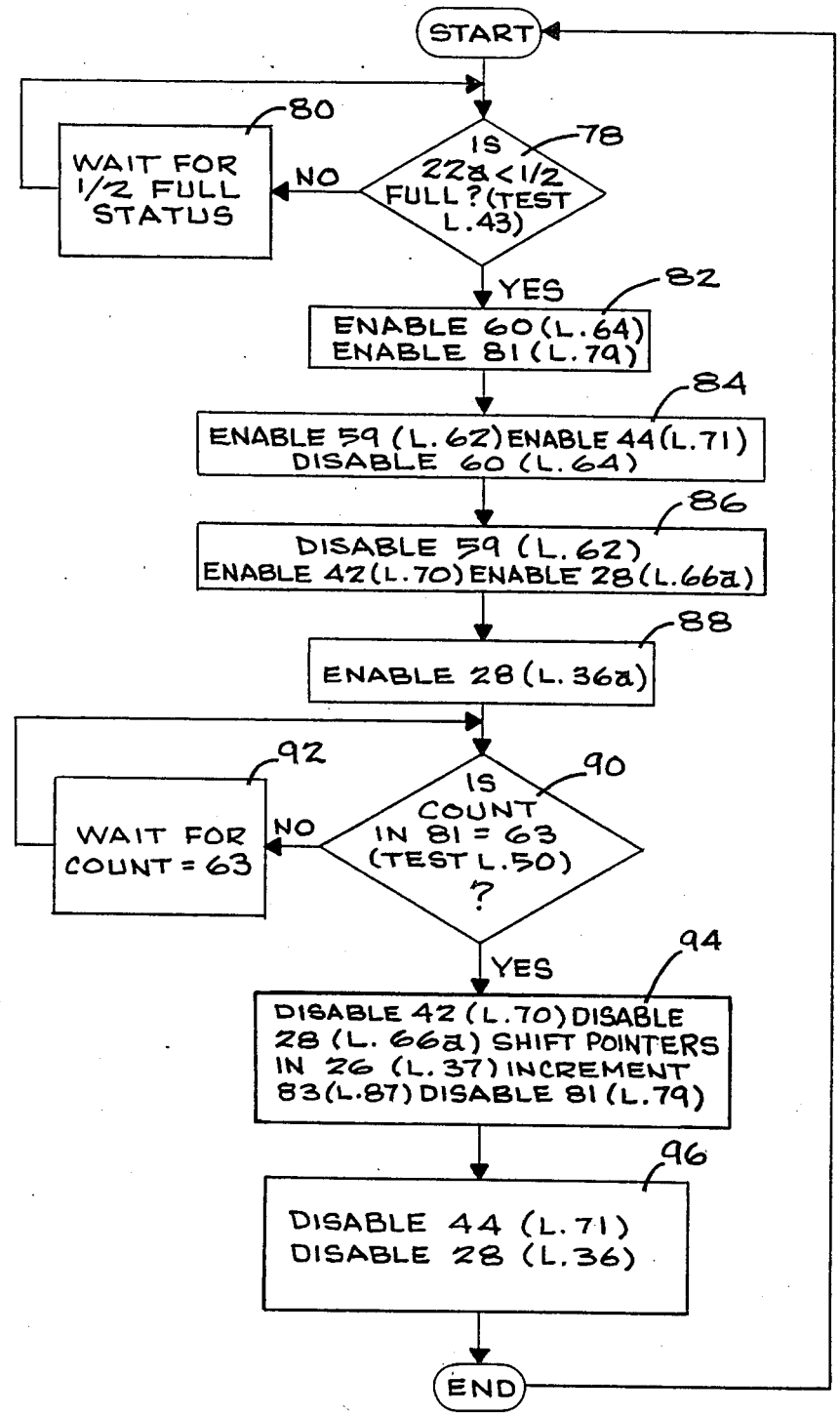
FIG_3

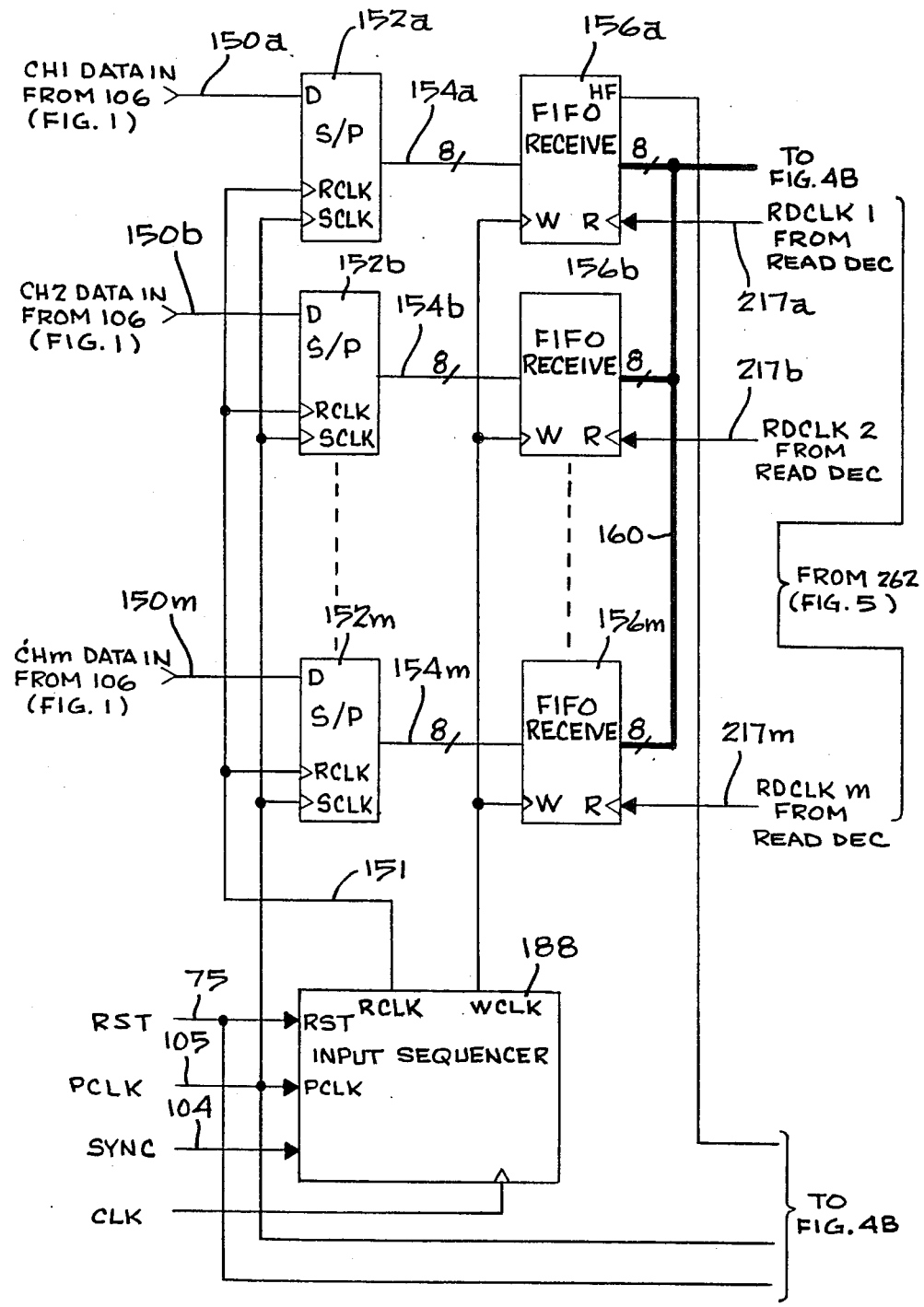
FIG_4A

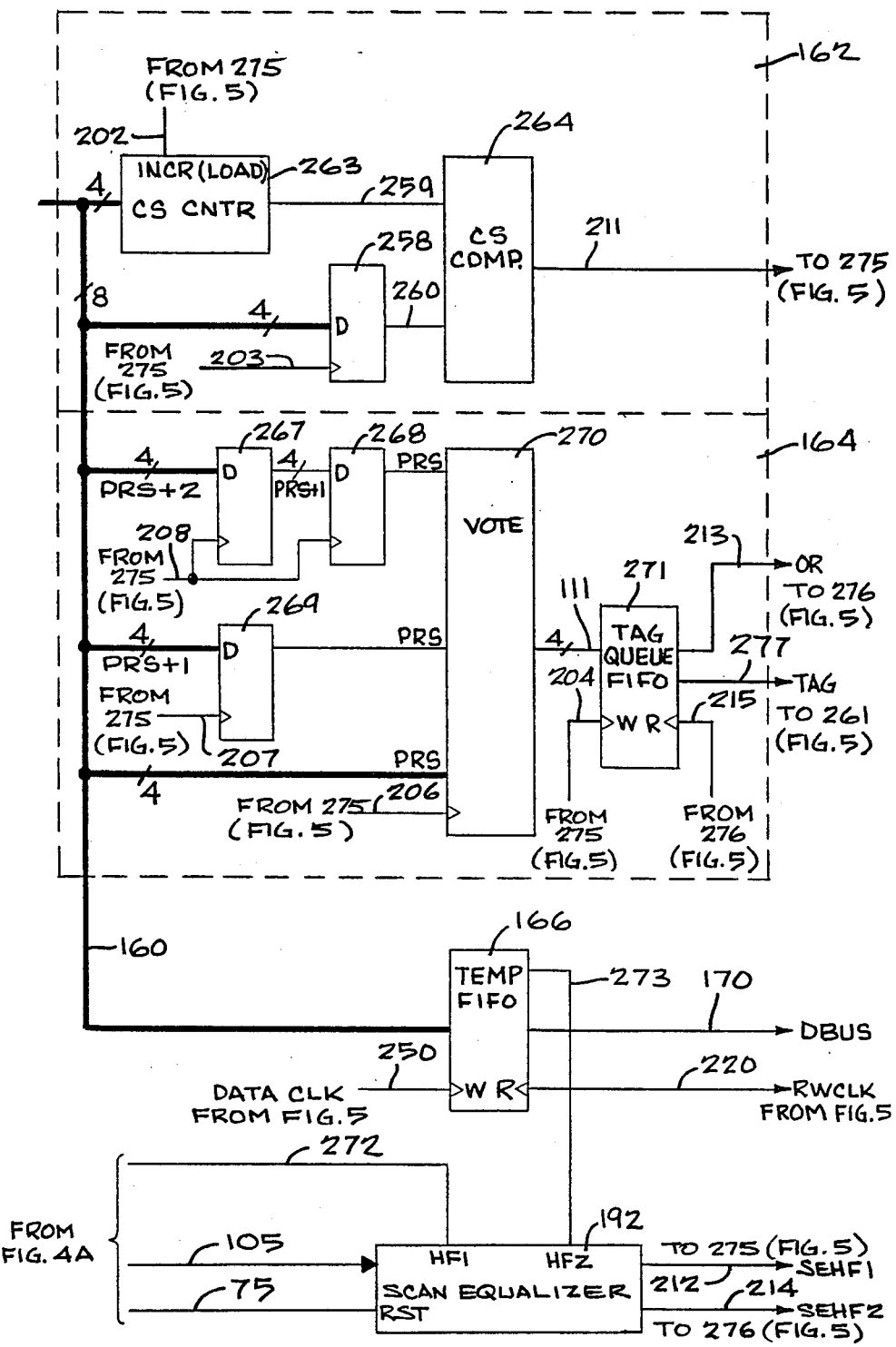
FIG_4B

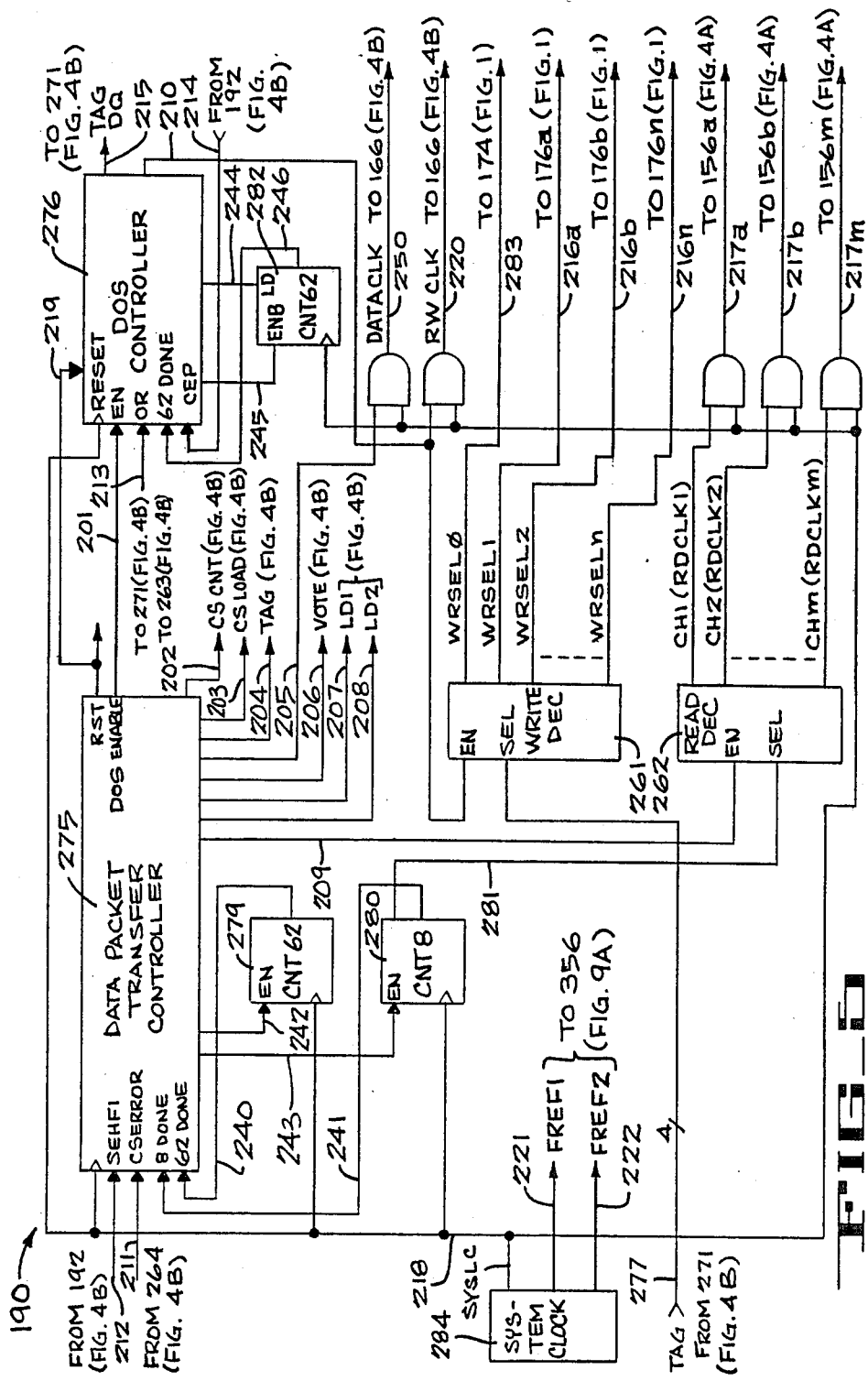
FIG_5

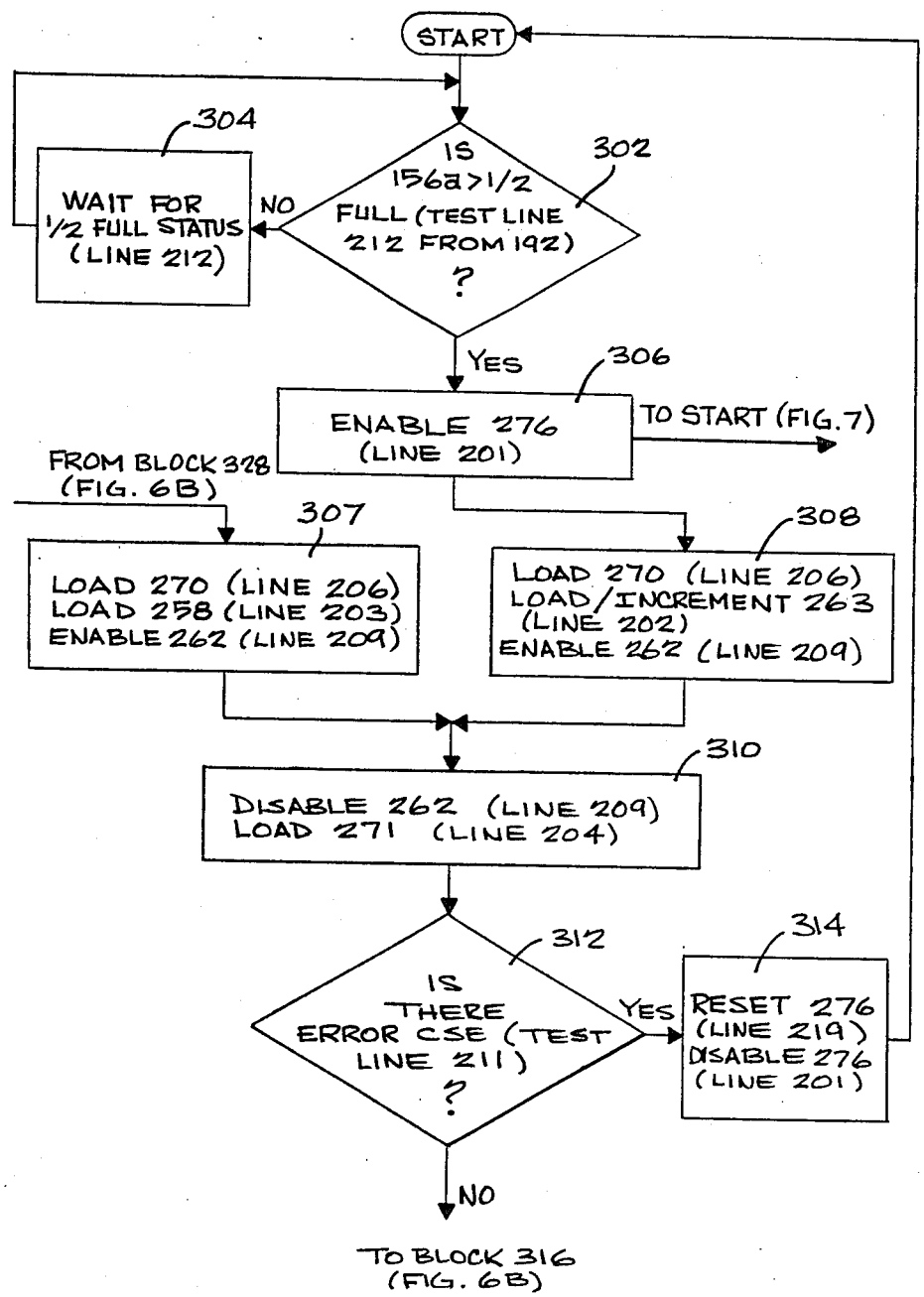
FIG_6A

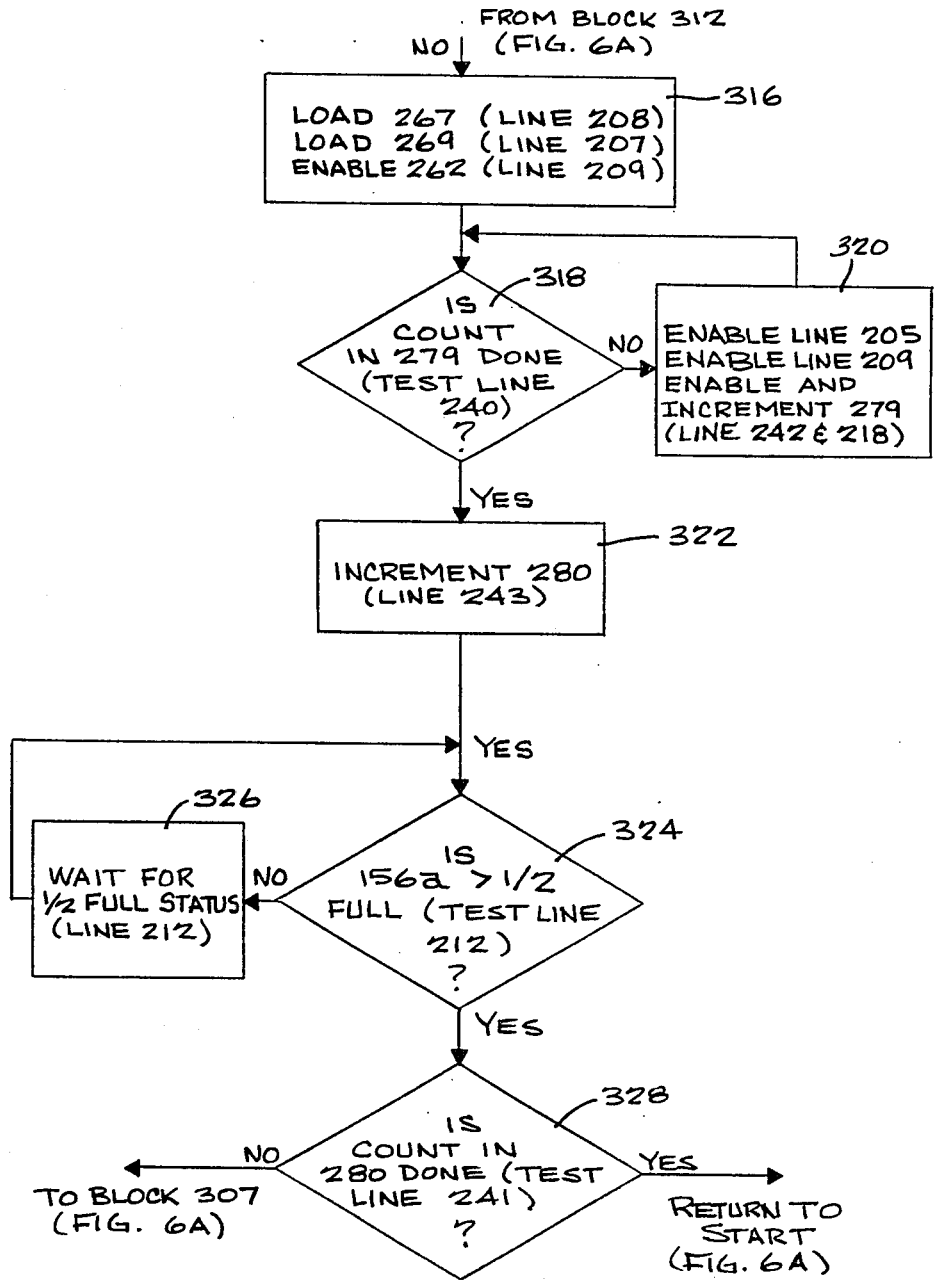
FIG_6B

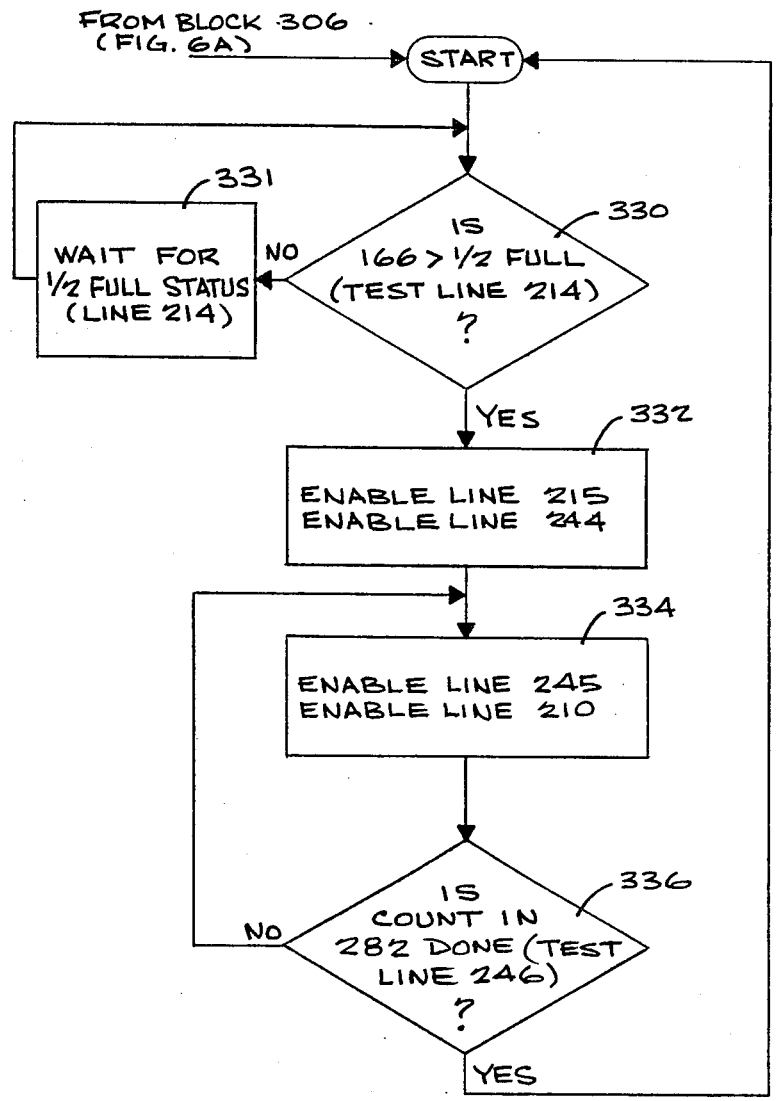
FIG_7

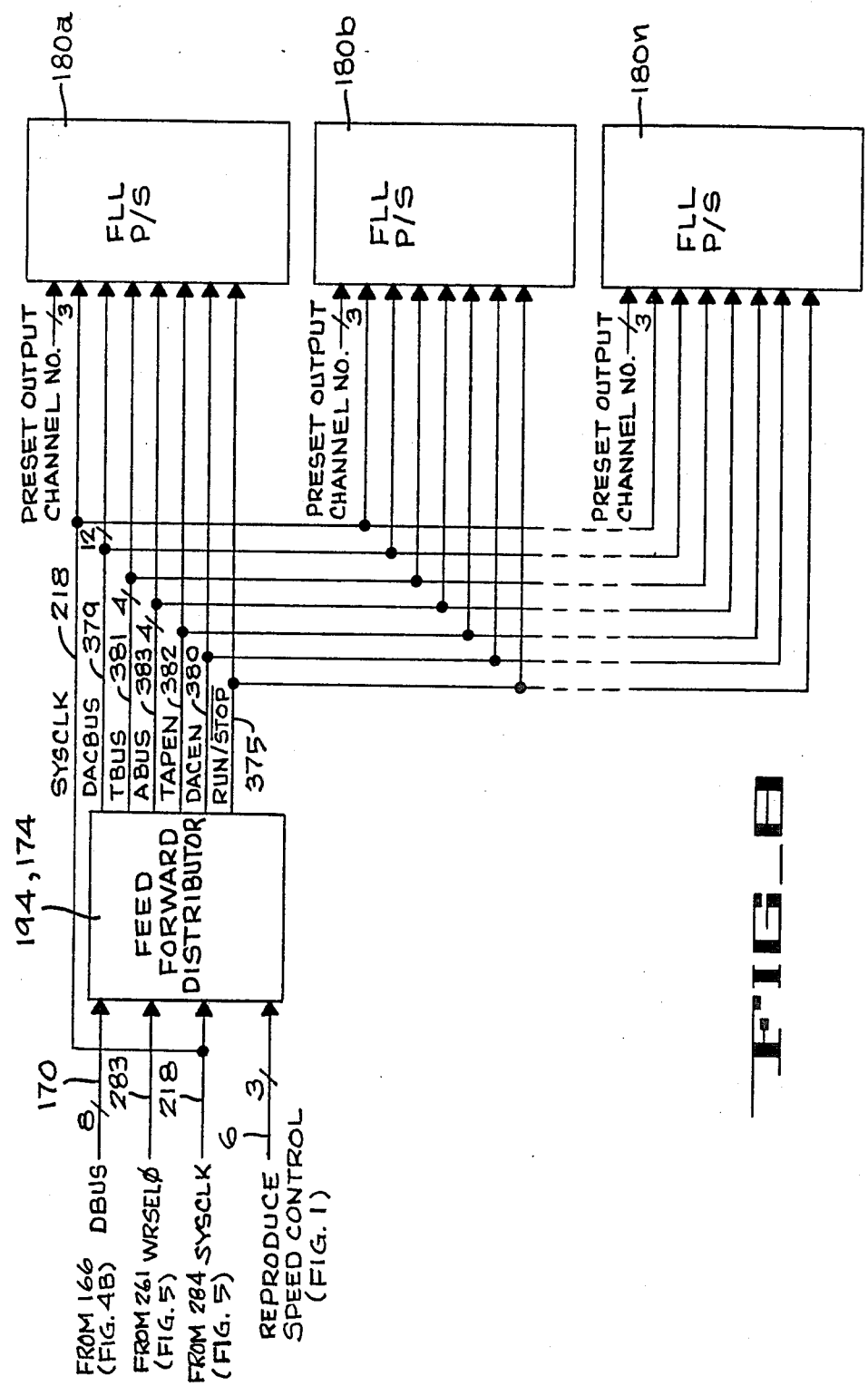
FIG_9

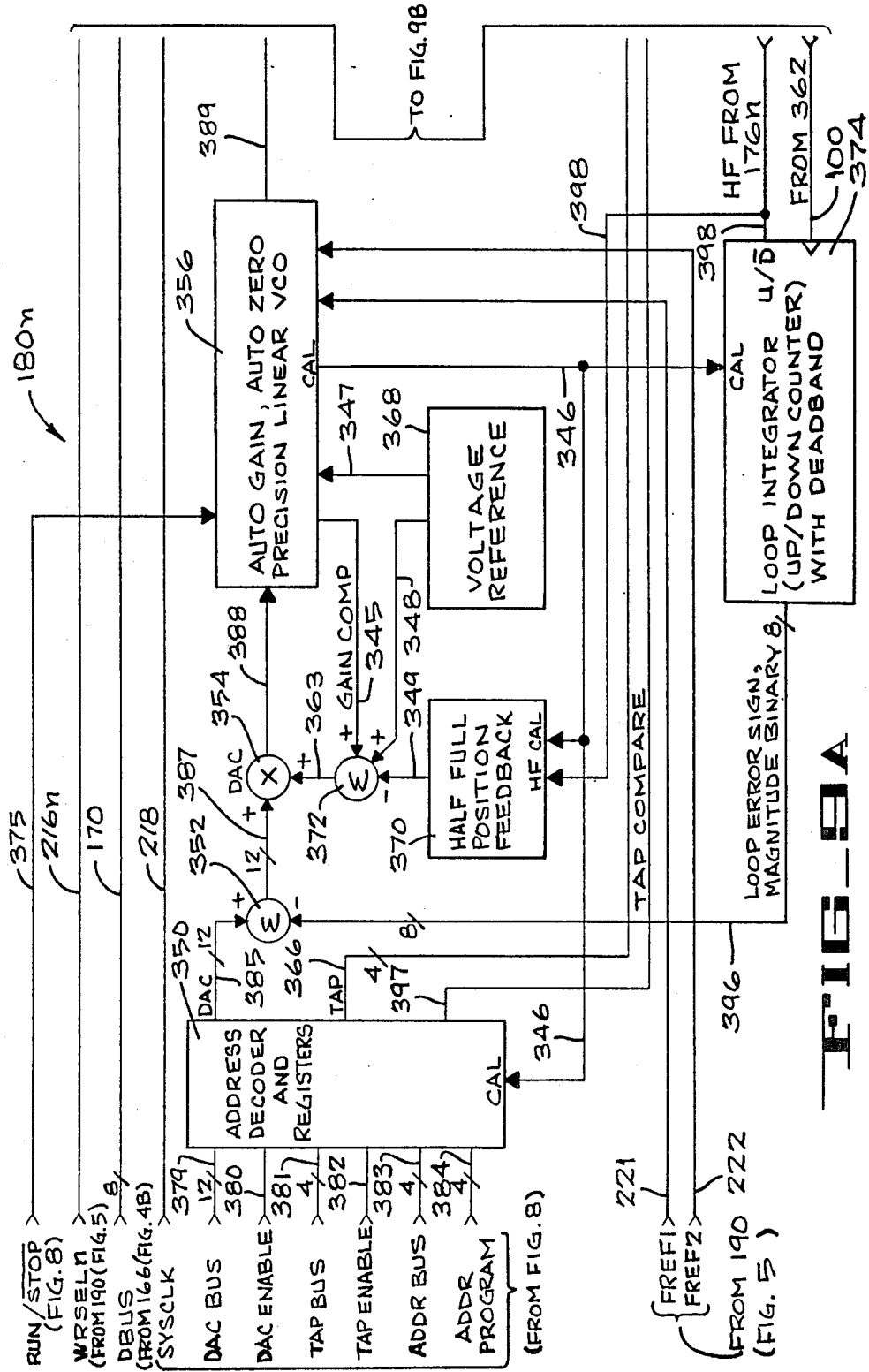

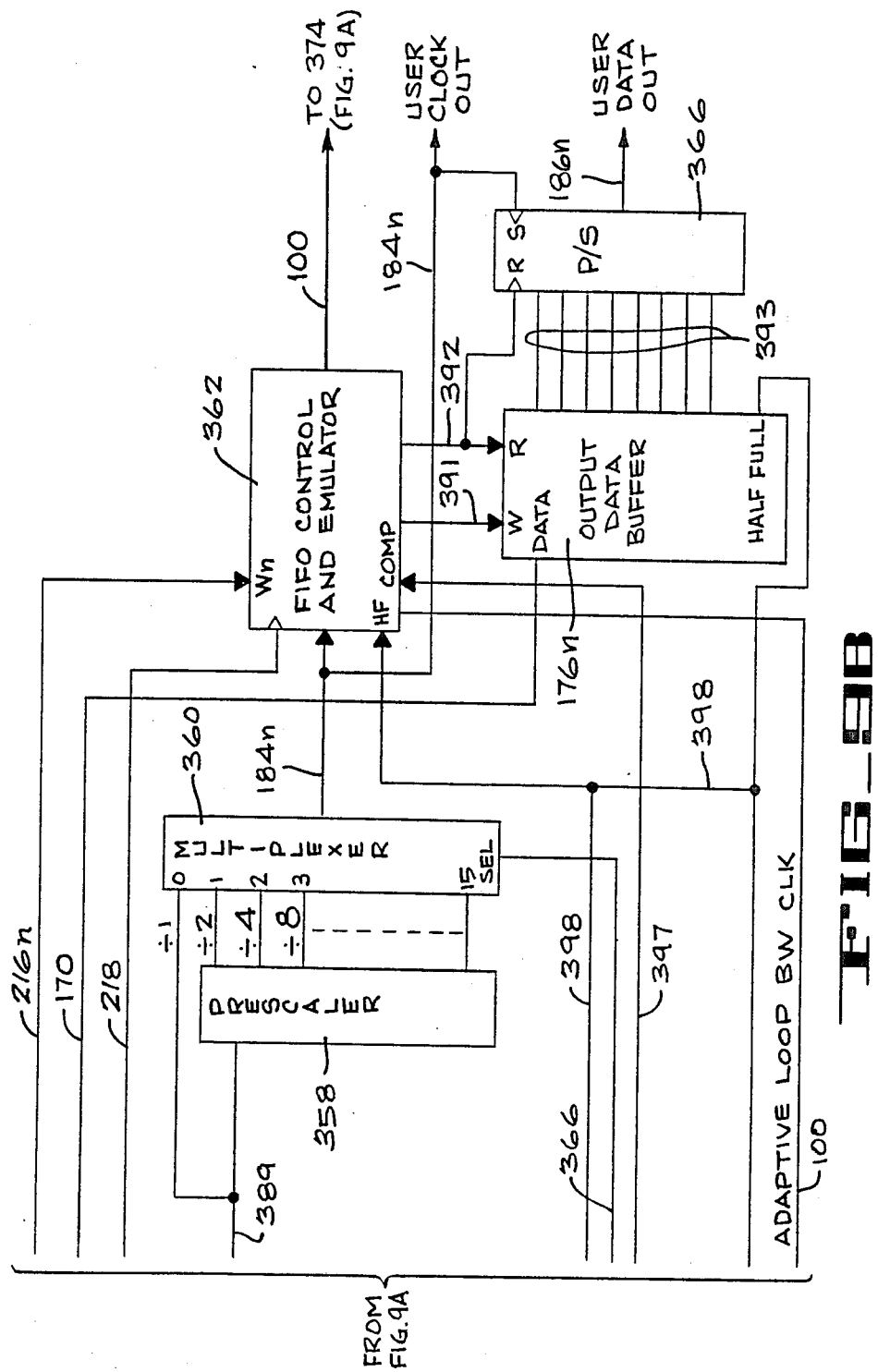
FIG_9B

ASYNCHRONOUS-TO-SYNCHRONOUS DIGITAL DATA MULTIPLEXER/DEMULTIPLEXER WITH ASYNCHRONOUS CLOCK REGENERATION

This invention relates to digital data multiplexing and demultiplexing, and more particularly to multiplexing data received on one or more communication channels at asynchronous clock rates, transmitting the received data synchronously on one or more data communication channels and demultiplexing the synchronous data for transmission at the asynchronous clock rates derived from the input clock rates for each channel.

BACKGROUND OF THE INVENTION

Data originating from a number of independent sources and sent via a plurality of data channels at various independent bit rates cannot be readily transmitted or recorded utilizing synchronous data transmission or recording devices. The use of such synchronous devices is much preferred over asynchronous transmission or recording because each asynchronous channel needs a separately tuned bit sync, and a separate deskew and error correction circuit to be utilized upon reception or reproduction of the transmitted data.

Prior art devices solved the above-indicated problem by sampling the asynchronous data synchronously on all channels utilizing a common sampling frequency. The thusly obtained samples were then transmitted or recorded utilizing synchronous data transmission or recording techniques, respectively. There are significant disadvantages associated with the foregoing technique as follows. In accordance with well known Nyquist's sampling theorem, also referred to as the Nyquist criteria, the sampling signal frequency must be greater than twice the highest bit rate of the sampled digital signal. Otherwise the signal recovered from the samples will not be an exact replica of the original input signal but will suffer undesirable distortion and information loss. Another disadvantage is that utilizing a common sampling clock frequency for a wide range of input signal frequencies results in inefficient use of the data transmission or recording channel bandwidth, particularly for relatively low data rates. For example, when the input data rate varies from 1 to 100 kilobits per second (kbps), and the common sampling clock has a frequency of 250 kbps, there will be two and one-half samples provided during each cycle of the 100 kbps signal, and 250 samples during each cycle of the 1 kbps signal. It is seen from the foregoing example that while there is utilized a near optimum number of samples per bit of the high bit rate signal, the large number of samples per bit of the low frequency signal is wasteful of the transmission time or recording medium, respectively, and results in a highly inefficient use of the transmission or recording channel bandwidth. Another disadvantage related to sampling of asynchronously clocked input data is the reduction of maximum bandwith which would be otherwise allowable for data transmission, due to frequency limitations of the data transmission or recording equipment.

SUMMARY OF THE INVENTION

The system of the present invention overcomes the above-discussed disadvantages of the prior art devices as follows. In accordance with the invention, a digital data multiplexer is provided which receives data via a plurality of data channels at unrelated asynchronous data rates and multiplexes the received data to allow synchronous transmission thereof, utilizing one or more synchronous data channels. The synchronously transmitted data is then demultiplexed and redistributed into a plurality of assigned output channels corresponding to the original input channels. The output data rate is regenerated from the original asynchronous input data rate.

More particularly, the present invention allows multiplexing data received on a plurality, for example n asynchronous data communication channels, for transmission utilizing one to m synchronous channels, and demultiplexing the thusly transmitted synchronous data for asynchronous transmission at the original or scaled data rate, utilizing n asynchronous data communication channels. Within the context of the present description and claims it is understood that synchronous transmission of data includes recording and reproduction of data, for example on a magnetic medium, utilizing one or more magnetic recording/reproducing channels.

In addition to the advantage of utilizing synchronous data transmission channels, the apparatus of the invention may utilize common bit sync rates, deskew and error correction circuits for all the channels. The data rate between the asynchronous input channels may vary over a wide frequency range, for example 40,000 to 1, while maintaining a desirable high efficiency of the synchronous data channel bandwidth and substantially reducing the bandwidth overhead penalty associated with sampling techniques.

Prior art clock regeneration systems require known input data clock rates from which the output rate can be regenerated. These known techniques could only regenerate clock signals within a limited, narrow range of the known clock rates.

With reference to the asynchronous clock regeneration system portion of the present invention, it allows a highly accurate regeneration of arbitrary clock rates spanning a range of more than four decades. The input data clock rate information related to each input channel is encoded into a coarse and a fine clock rate value, utilizing a redundant coding method to prevent erroneous frequency information from contaminating the asynchronous clock regeneration system performance. The encoded coarse and fine clock rate information is transmitted via the synchronous transmission channel along with the input data. That information is utilized on the receiving side as feed forward clock rate information applied to a frequency locked loop which reconstructs the output clock rate for each asynchronous data output channel. A separate loop for each channel is utilized and the resulting reconstructed clock rate is servoed to provide an accurate asynchronous output user clock rate. This is accomplished with a fine loop adjustment of a VCO frequency to compensate for inaccuracies in the received feed forward frequency information.

BRIEF DESCRIPTION OF THE DRAWINGS

FIGS. 2A to 2D are consecutive portions of a more detailed block diagram showing the data multiplexer 1 of FIG. 1.

FIG. 3 is a flow chart depicting the operation of the data input transfer controller 20 of FIG. 1.

FIGS. 4A and 4B are consecutive detailed block diagrams showing portions of the data demultiplexer 3 of FIG. 1.

FIG. 5 is a detailed block diagram of the data output transfer controller 190 of FIG. 1.

FIGS. 6A and 6B are consecutive portions of a flow chart depicting operation of the data packet transfer controller 275 of FIG. 5.

FIG. 7 is a flow chart depicting operation of the data output sequence controller 276 of FIG. 5.

FIG. 8 is a block diagram showing distribution of signals from the feed forward distributor 194 and dummy RAM circuit 174 to the output channels of FIG. 1.

FIG. 9 has two consecutive portions (9A and 9B) which together show a detailed block diagram of the frequency locked loop and parallel-to-serial circuit 180n of FIG. 1.

DETAILED DESCRIPTION

Figure 1A:
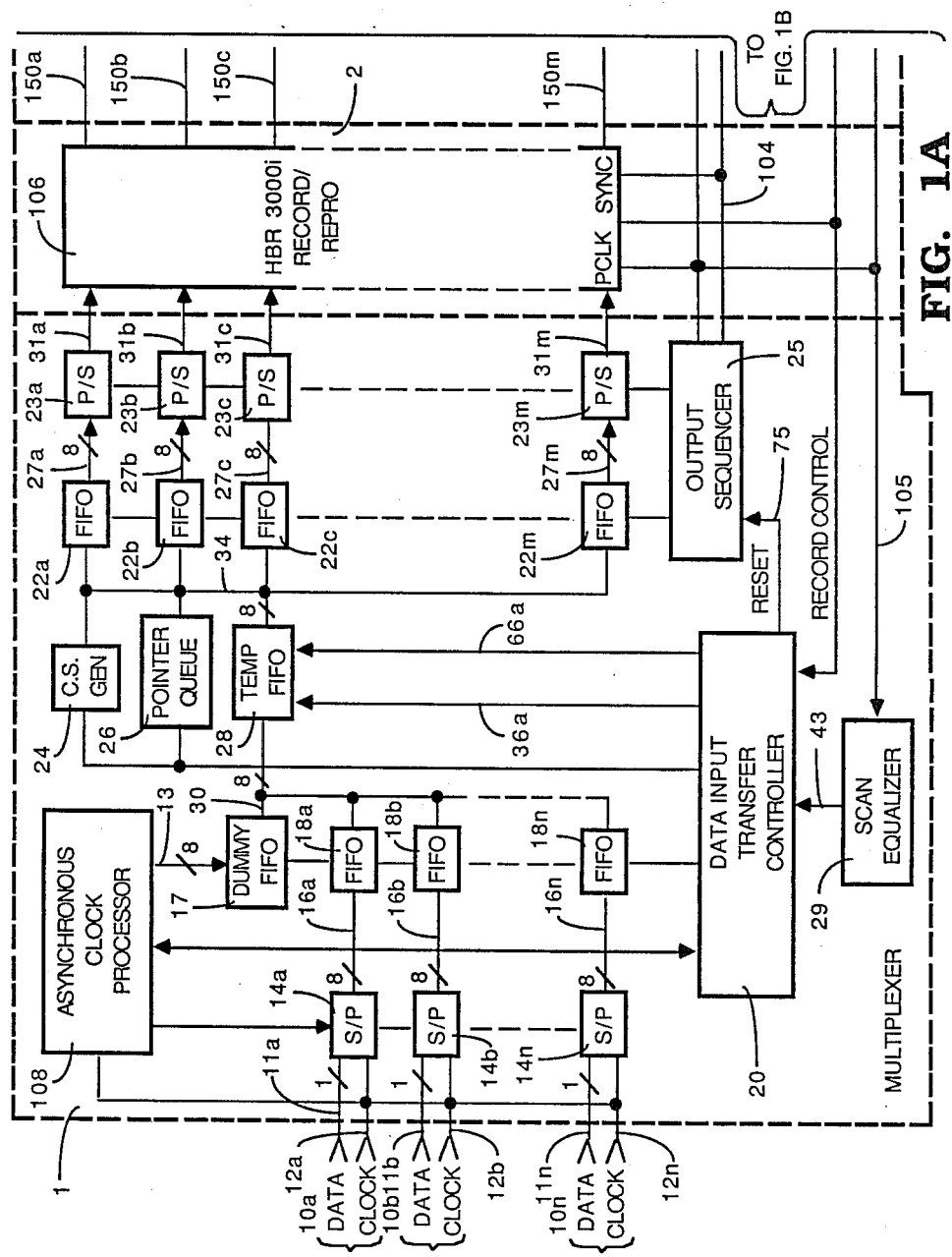
FIG. 1 has two consecutive portions (1A and 1B) which together show a block diagram of a preferred embodiment of the system in accordance with the invention.

It is noted that in the present description corresponding circuit elements are designated by like reference numerals in all the drawing Figures.

Figure 1B:
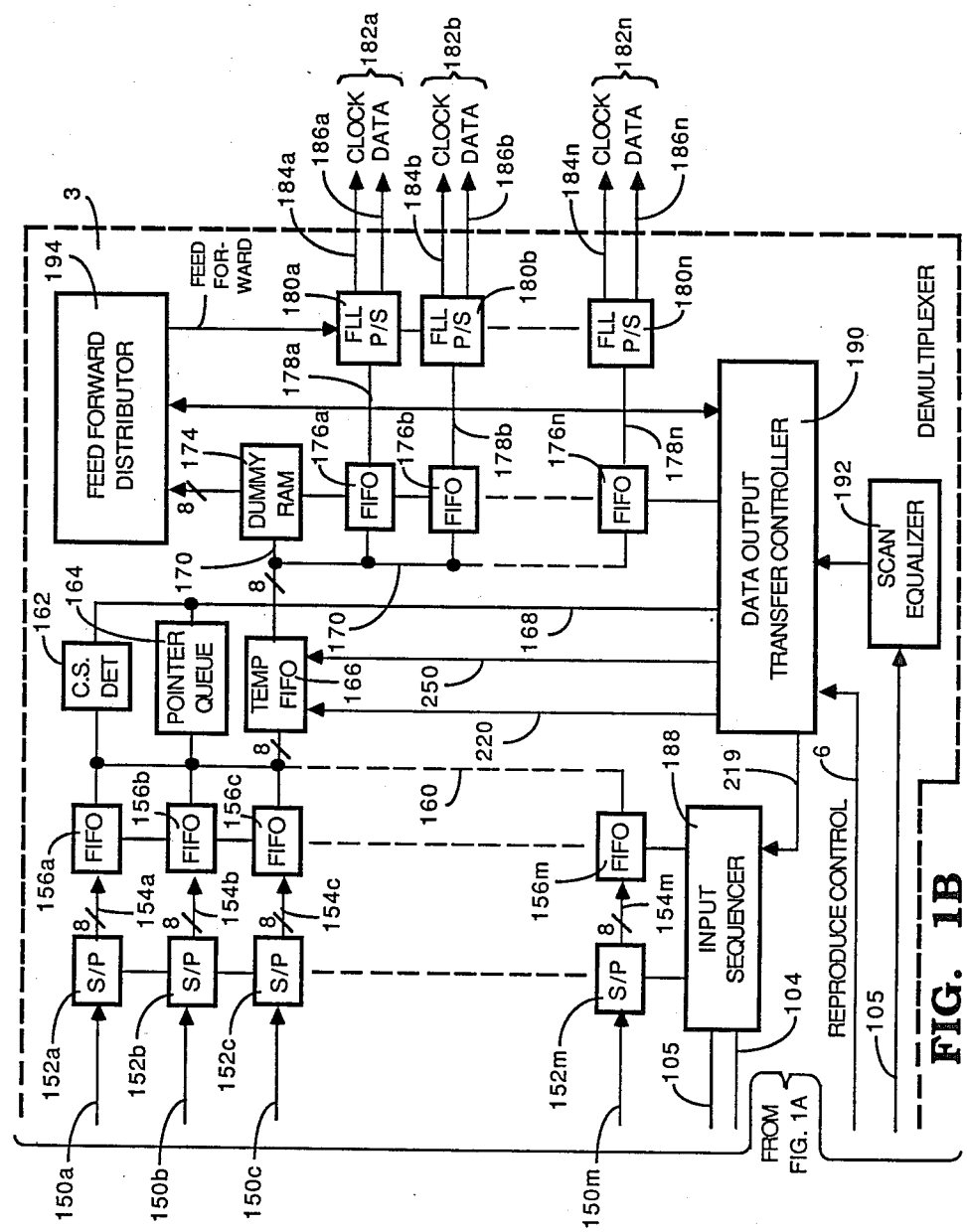

A block diagram of an asynchronous-to-synchronous digital data multiplexer and demultiplexer in accordance with the preferred embodiment of the invention is shown in FIG. 1 and will be now described in detail. The block diagram of FIG. 1 comprises an asynchronous-to-synchronous digital data multiplexer portion 1, a synchronous data transmitter portion 2, and a synchronous-to-asynchronous data demultiplexer portion 3. To facilitate the description, these respective portions are encircled by interrupted lines and each portion will be described separately.

First, the asynchronous-to-synchronous data multiplexer portion 1 of FIG. 1 will be described. Information in the form of continuous asynchronous serial digital data streams and related clock signals are received on a plurality of input channels 10a to 10n, represented by data lines 11a to 11n and clock lines 12a to 12n, respectively, for example utilizing well known serial data communication links. The data and clock on each input channel may not be related to those of the other channels or to a synchronous data transmission rate, as will be described further. Therefore, the present description refers to such data and clock signals as asynchronous. The data on each channel is received by a serial-to-parallel (S/P) converter 14a to 14n in which the received serial data is converted to parallel data, in the preferred embodiment to 8 bit words, further referred to as data bytes. The conversion of data from serial to parallel is to adapt the data to commercially available FIFO buffers which have 8 bit wide data paths and lower bandwidths at each path. The parallel data bytes from each converter 14a to 14n are continuously transferred via lines 16a to 16n to an input FIFO (first in - first out) data storage buffer 18a to 18n, at one-eighth of the serial input clock rate.

With respect to the fact that the input data clock rates between the various input channels may vary over a wide range, for example in the preferred embodiment from 250 bps to 10 Mbps, it will be appreciated that the input FIFOs 18a to 18n fill with data at largely varying speeds. A data input transfer control circuit 20, further referred to as input control, sequentially monitors a predetermined level of fullness of all input FIFOs, which in the preferred embodiment is a half-full status. When such half-full FIFO status is detected, data therefrom is transferred in the form of a data packet to a temporary FIFO 28, which stores data packets from several input FIFOs in the order of detection. The address of each input FIFO whose data is stored in the temporary FIFO 28 is stored in a pointer queue 26, in an order corresponding to that of the data packets stored in the temporary FIFO 28. The data packets from the temporary FIFO 28 and the corresponding addresses from the pointer queue 26 and other packet header information are transferred out sequentially by bytes, that is in the order in which they are stored. Consequently, the data from the input FIFOs are transferred not only in the order in which they have been received, but also in the order of detecting the half full status, which in turn is dependent on the input data rate. A continuous data flow from the asynchronous input channels is thereby maintained, as it will follow from further description.

In the preferred embodiment the input control 20 comprises a state machine, and other control circuitry which is necessary for controlling the data flow from the asynchronous input channels to the synchronous transmit or recording channels, via a temporary storage memory implemented by the temporary FIFO 28. As it is well known, a state machine is a digital control device which performs a desired, well defined control process, depending on input variables, as it will be described further in detail. Preferably the state machine utilizes a ROM (read only memory) for permanently storing the desired control program. Alternatively, as the input control 20 a microprocessor-based control device may be utilized which, however, operates at a slower rate.

The preferred embodiment utilizes m synchronous transmission FIFOs 22a to 22m, further referred to as transmit FIFOs, each being assigned to one synchronous transmission channel. The input control 20 monitors the fullness of one selected transmit FIFO, for example FIFO 22a. When that FIFO is less full than a predetermined level, that is, in the preferred embodiment less than half full, a packet of data on queue in the temporary FIFO 28 is transferred thereto, together with the header information identifying that packet. It is noted that the other transmit FIFOs do not need to be monitored for fullness, because on the average each has an equal number of data packets written therein, and the data from all these FIFOs 22a to 22m is being transferred synchronously and thus all are substantially equally full.

Data from an input FIFO 18a to 18n is transferred to the temporary storage FIFO 28, which is common to all channels, via an 8 bit parallel data bus 30. In the preferred embodiment the header information identifying that packet comprises an address pointer which accurately identifies the input channel on which that particular packet of data has been received. There is a well defined precise relationship between each packet stored in the temporary FIFO 28 and the address pointer generated by the input control 20 and stored sequentially in the pointer queue 26, as it will be described in detail. The data portion of a packet from the temporary FIFO 28 and corresponding header information are transferred to a transmit FIFO, for example 22a, after it has been detected as being less than half full. The next in line data stored in FIFO 28 and header information are thereafter transferred to a next in line transmit FIFO, for example 22b, and so on sequentially, until all the FIFOs 22a to 22m received packets. The above-described cycle of operation will be further referred to as a scan. Thereafter the entire scan is repeated upon detecting the next less than half full status of the monitored transmit FIFO 22a.

The transfer of data from an input FIFO 18a to 18n on queue to a transmit FIFO 22a to 22m is provided in data packets as follows. In the preferred embodiment each packet is 64 bytes long and includes 62 bytes of data and two bytes of pointers generated by a common sequence (CS) generator 24 and a pointer queue 26 as follows. The CS generator is implemented by a modulo N counter, whose count is incremented after each scan. In the preferred embodiment the data generated by the CS generator 24 is represented by one four bit number, further referred to as a nibble. The pointer queue sequentially stores three four bit numbers, further referred to as nibbles, one representing the address of the input FIFO on queue from which data is being transferred presently into the temporary FIFO 28. The other two nibbles represent the addresses of the previous two input FIFOs on queue. These redundant pointers are utilized for fault tolerance by a majority vote detector during data demultiplexing, to reduce the effect of bit errors in pointers which may occur during transfer of data, and to assure that during data reassembly by the demultiplexer portion 3 of FIG. 1 each packet of data will be routed to the proper output channel, as it will be described further in detail.

Thus the input control 20 controls transfer of the data from each input FIFO 18a to 18n to the temporary FIFO 28 via a data bus 30, as well as data transfer from the temporary FIFO 28, together with the header information from CS generator 24 and pointer queue 26, via data bus 34 to one of the synchronous channel FIFOs 22a to 22m as previously described. During the data transfer the input control 20 sequentially monitors the half full status of the input FIFOs as well as of the transmit FIFOs and provides for continuous flow of data to the transmit FIFOs for synchronous data transmission, as it will be described further.

Now the output sequencer 25 and the scan equalization circuit of 29 of FIG. 1 will be described. The output sequencer 25 controls the timing of read control signals from the transmit FIFOs 22a to 22m, and of load control signals, applied to the parallel-to-serial (P/S) converters 23a to 23m as follows. The input control 20 waits for the transmit FIFO 22a to become half-full. When it becomes half-full, the output sequencer 25 begins operation. It receives a parallel clock signal on line 105 and a synchronizing signal on line 104, from the synchronous channel transmission device 106 of FIG. 1. The output sequencer starts a synchronous data transfer simultaneously from each transmit FIFO 22a to 22m to a respective parallel-to serial (P/S) converter 23a to 23m via respective 8 bit parallel lines 27a to 27m, and a simultaneous synchronous data transfer from each P/S converter 23a to 23m via lines lines 31a to 31m to the synchronous data transmission channels of the transmission device 106. In the preferred embodiment, during the output transfer a previously described 64 byte data packet is being transferred, which contains 2 bytes of header information, followed by 62 bytes of data. The output sequencer 25 further verifies simultaneously whether the 4 bit common sequence nibble contained in the header information is identical in all the synchronously transmitted serial output data streams of all channels on 31a to 31m. The timing for the 4 bit comparison is provided by the TF signal one line 102, as it is shown in FIG. 2D. The output sequencer also verifies synchronization of the first bit of the common sequence nibble to the external synchronizing pulse 104 received from a synchronous data transmission device 106.

In the preferred embodiment the synchronous transmission device 106 is a magnetic tape recording/reproducing device, in which the synchronous data transmission channels are represented by m parallel magnetic recording/reproducing channels (not shown). In the presently described example eight recording/reproducing channels are utilized. The recording/reproducing device 106 is preferably a multichannel longitudinal tape recorder/reproducer, for example type HBR-3000 manufactured by Ampex Corporation, assignee of the present patent application. It is noted however that the system of the present invention is not restricted to the use of this particular recording/reproducing device, and any other well known bit precise parallel synchronous device may be utilized instead. Alternatively, a well known synchronous data transmission device having 1 to m parallel data communication channels may be utilized.

The output signal from all P/S converters 23a to 23m is transferred simultaneously to the tape recorder 106 synchronously, via parallel lines 31a to 31m. The data from each parallel line is recorded longitudinally on a parallel magnetic tape channel by the recorder/reproducer 106 in a manner well known in the art. Consequently, the recording and playback operations provided by the recorder/reproducer 106 will not be described in detail.

The scan equalizer 29 provides equal spacing between the respective data packet transfers from temporary FIFO 28 to the respective transmit FIFOs 22a to 22m, during the previously described scan interval as follows. It divides the parallel clock rate on line 105 by the lowest integer number of the ratio between the number of bits in the packet and the number of synchronous transmit channels and provides a metering clock to govern the scan packet transfers. In the preferred embodiment the parallel clock rate is equal to the bit rate, there are 512 bits in one packet, and the selected number of synchronous channels is m=8. That is, during one scan interval eight packets of data are transferred sequentially to the transmit FIFOs from the temporary FIFO 28. It is noted that during one scan interval 64 bytes of data and header information contained in each data packet are transferred to each transmit FIFO 22a to 22m synchronously in 8 bit parallel form, and therefore, the serial bit length of each scan is 64×8=512 bits. The scan equalizer is preferably a clock divider which divides by 512/m the parallel synchronous clock rate applied on line 105, which in the preferred embodiment is equal to the synchronous data clock rate on the m parallel-to-serial output lines. That is, in the preferred embodiment the scan equalizer divides the parallel clock on line 105 by (512/8)=64. The scan equalizer therefore divides the parallel clock rate on line 105 by 64 to obtain a clock which meters the data packet transfers within the one scan period into 8 equally spaced transfer intervals. It applies the thusly divided output clock and the FIFO ½ full information to produce the metered half full (HF) status on line 43 to input control 20. The input control in turn controls the timing of the sequential data packet transfer to the respective transmit FIFOs metered by the clock on line 43 such that the sequentially occurring packet transfers are equally spaced within the scan interval. Data transfer in the form of consecutive bursts of data packets following in close succession is thereby avoided. Such bursts would introduce excessive grouping of channel packets which would introduce jitter into the data upon asynchronous clock reproduction.

With further reference to FIG. 1, the asynchronous clock rate processor 108 measures the respective input clock rates on lines 12a to 12n and computes a coarse and a fine clock rate adjustment value for use in the output clock regeneration circuit which will be described later. In the preferred embodiment the processor 108 is implemented by a microprocessor. The microprocessor 108 provides random sample measurements of the input data clock rate on each input channel, further referred to as the user clock rate, on lines 12a to 12n shown in FIG. 1, utilizing a reference sampling rate and independent measurement circuits. It counts the number of reference samples obtained during a predetermined number of user clock cycles on each channel and therefrom it determines the user clock rates. The microprocessor 108 further computes for all the channels the previously mentioned coarse adjustment value, further referred to as TAP and the fine adjustment value, further referred to as DAC, from the measured user clock rate on each channel and from equations as it will be described later. The microprocessor assembles these computed TAP and DAC values in a data packet format necessary for disassembly at demultiplexing for the reconstitution of the asynchronous clock rate at the demultiplexer channel output. The data packet format is similar to the other packets utilized for transmission. The formatted packet is then stored in the dummy FIFO 17 shown in FIG. 1 via an eight bit bus 13. Thus the data in the dummy FIFO 17 contains the most recent asynchronous user clock information related to all the input channels. The operation of FIFO 17 will be further described in detail. The data from the dummy FIFO 17 is transmitted to the temporary FIFO 28 and therefrom to the transmit FIFOs 22a to 22m whenever information is not available for transfer from any of the input FIFOs 18a to 18n. The thusly transmitted user clock information is then recorded on the tape and upon reproduction it is utilized for clock regeneration circuit adjustment as it will be described later.

With further reference to FIG. 1, the data demultiplexer portion 3 will now be described. The data reproduced from the parallel channels of the record/reproduce device 106 is received synchronously on all parallel lines 150a to 150m at the parallel clock rate on line 105. An input sequencer 188 receives the synchronizing pulse on line 104 to synchronize the beginning of the serial-to parallel transfer of data by S/P converters 152a to 152m. The header information which is also synchronized to the synchronizing pulse 104 therefore can be read in the first and second byte reads of a packet from the receive FIFOs 156a to 156m. The S/P converters convert the serial data stream on each line 150a to 150m to 8 bit bytes which are written via bus 154a to 154m into the following receive FIFOs 156a to 156m at ⅛ of the parallel clock rate.

A data output transfer control circuit 190, thereafter called output control, detects a scan equalized half full status of a selected receive FIFO, for example 156a, and initiates transfer of a data packet therefrom. That data transfer process includes transferring the three nibbles of pointer information to a pointer queue detector 164, one nibble of common sequence information to a common sequence detector 162, and 62 bytes of data to a temporary FIFO 166 which is common to all output channels. The common sequence detector verifies whether the data reproduction system is in sync and provides a common sequence error signal on line 168 to the output control 190 when an error condition is detected, as it will be described in more detail.

The pointer queue, detector 164 controlled by the output control 190 strips the three pointer queue nibbles of the header information from each data packet during the 64 byte packet transfer. A pointer queue voter makes a decision based on the stripped and delayed redundant pointer queue nibbles, which indicate an input channel address, as previously described, to which output channel each corresponding data packet, stored in the temporary FIFO 166, should be sent.

A scan equalizer 192 operates in a similar manner as previously described with reference to scan equalizer 29 of FIG. 1. It divides the parallel clock on line 105 by the lowest integer of the ratio of the packet length, divided by the number of synchronous channels, and it provides for even transmission intervals of the packets within the one scan interval during the data transmission to the temporary FIFO 166. The data packets from the temporary FIFO 166 are transmitted to appropriate output channel FIFOs 176a to 176n or dummy RAM 174. In the preferred embodiment the number of output channel FIFOs corresponds to the number n of input channel FIFOs 18a to 18n. The data packets from the temporary FIFO 166 are transferred each to an appropriate output FIFO as designated by the corresponding address pointer queue. After the data is received by an output FIFO, it is transferred therefrom at an appropriate asynchronous clock rate to an output channel associated with that output FIFO. The appropriate asynchronous clock rate and data for each channel are provided by a frequency locked loop (FLL) and parallel-to-serial (P/S) converter circuit 180a to 180n, respectively, associated with that channel. Each FLL circuit comprises an asynchronous clock regenerator and clock calibrator circuit which will be described in more detail later. The FLL circuit is utilized to reconstruct the original user clock rate for each user channel so that data can be clocked back to the user at the same rate as, or proportional to, the rate at which it was originally received from the user.

A dummy storage device 174, preferably implemented by a RAM, contains a packet of data which has been transferred from the dummy FIFO 17 of the multiplexer portion 1 of the block diagram of FIG. 1. As it has been previously described, that data is related to the measured asynchronous user clock rate for each channel and is in the form of a formatted data packet containing each channel's TAP and DAC clock rate information. A feed forward distributor 194 receives information from the RAM 174 and distributes the appropriate asynchronous TAP and DAC clock information, also referred to as feed forward information, to the FLL circuit 180a to 180n of each output channel, as will be described.

Now the operation of the asynchronous clock processor 108 of FIG. 1 will be described in more detail, specifically with respect to the calculations of the TAP and DAC values representing the user clock rate on the respective input channels. In the preferred embodiment the input clock rate measurement is provided by running a high speed counter at a real time reference frequency over a fixed number of user input clock cycles. Preferably the selected number, Ns of clock cycles is the number 2 raised to the $n^{th}$ power. The symbol Ns, referred to as the sample interval, indicates the number of bits used in the frequency measurement sample, for example Ns=16. The real time counter counts for a time period equal to 16 of the user input clock cycle periods. In the preferred embodiment the reference clock frequency is Fref=40 MHz. The measured user input clock frequency may then be derived from $$F = \frac{Ns * Fref}{Ncnt} \; [bps] \quad (1)$$

where
F is the measured user clock frequency for a particular input channel;
Fref is the high frequency real time reference clock;
Ncnt is the number of reference clock counts obtained during the sample interval;
The TAP number NTAP is then computed from the following equation:

$$NTAP = INT[log_2(Ncnt)] - log_2(Ns) - 3 \quad (2)$$

where Ns and Ncnt are values as it has been indicated above, and the 3 is an offset number related to the resolution of the system.

The NTAP values are preferably contained in a look-up table and taken therefrom when the Ns and Ncnt values are known.

The DAC number NDAC is computed by the microprocessor 108 from the following equation:

$$NDAC = \frac{2^{Nd} * 2^{NTAP} * Frp * Ns * Ncrc}{Fvcomax * Nsrc * Ncnt} \quad (3)$$

where
Nd is the number of bits utilized by the D/A converter 354 in FIG. 9 (that is, Nd=12 in the preferred embodiment);
NTAP is the result from equation (2);
Ns and Ncnt are values indicated previously with reference to equation (2);
Nsrc is the number of clock bits present in one sample interval of the parallel clock rate 105 measurement;
Ncrc is a reference count obtained by measuring the parallel clock on line 105;
Frp is a reproduce parallel clock frequency look-up number which is a function of the recording density setting and tape speed of the tape recorder 106 of FIG. 1 and is obtained from $$Frp = DEN*SPD \; [Kbits/sec] \quad (4)$$

where
DEN is the recording density [Kbits/inch]; and
SPD is the tape speed [inch/sec]
Fvcomax is the maximum output frequency from the VCO 356 of FIG. 9 [Hz].

As soon as the latest TAP and DAC numbers are known for each channel, they are formatted by the microprocessor 108 of FIG. 1 as 8 bit bytes and assembled in the dummy FIFO, 17. The dummy data maintains specific bytes pertaining to each channel in specific assigned locations within the packet as it is transmitted during dummy reads by the multiplexer. These data packets are applied from the processor 108 via line 13 and are written into the dummy FIFO 17 of FIG. 1 when the multiplexer is servicing an input FIFO other than 17. These DAC and TAP bytes pertaining to each channel are then utilized by the demultiplexer portion 3 of the system of FIG. 1 to reconstitute the asynchronous output clock rate for each output channel 182a to 182n.

FIGS. 2A to 2D show a more detailed block diagram of the above described multiplexer portion 1 of the block diagram of FIG. 1. Now a more detailed description of the data flow from the input FIFOs 18a to 18n, shown in FIG. 2A, to the transmit FIFOs 22a to 22m, shown in FIG. 2D, will be given with reference to FIGS. 2A to 2D. FIG. 2C and a portion of FIG. 2B which includes an input channel multiplexer 38 and an input queue sequencer 40, show the input controller 20. With further reference to FIG. 2B, the multiplexer 38 receives a half-full flag output signal HF1 to HFn from each input FIFO 18a to 18n shown in FIG. 2A via lines 46a to 46n. The queue sequencer 40 is preferably implemented as a circular counter which continuously counts the input channel addresses 1 to n and applies the current address count to the multiplexer 38 via an address selection line 33. In response to the address count on line 33 and a received greater than half full signal the multiplexer applies an output signal via line 47 to the circular counter 40 which then stops counting, thereby putting an input channel address on queue. The queue sequencer 40 applies via line 49 a 4-bit nibble, corresponding to the input FIFO address at which the half-full status has been detected, to the pointer queue 26. The pointer queue in turn stores that input FIFO address on queue. As it will be described later in more detail, when a HF signal is not received, the counter 40 outputs a zero address which is assigned to the dummy FIFO 17 shown in FIG. 2B, which contains information related to the asynchronous clock regeneration circuit, as it has been described above. That address is then stored on queue by the pointer queue 26. In the preferred embodiment the pointer queue 26 has three cascaded registers 51 to 53 referred to as a nibble shift register. The third of the cascaded registers, register 53, contains the address (PRES) of the input FIFO 18a to 18n previously on queue from which a data packet has previously been transferred to the temporary FIFO 28 and is presently being transferred from the FIFO 28 via a data bus 34 and latch 73 to one of the transmit FIFOs 22a to 22m, as shown in FIG. 2D. The second register FIFO 52 contains the address (PRES+1) of an input FIFO data packet stored in 28, the corresponding data packet of which will be transferred next to a transmit FIFO. The first register 51 contains the address (PRES+2) of an input FIFO on queue whose contents will be transferred next to the temporary FIFO and from the temporary FIFO 28 after the transmission of the contents of (PRES) and (PRES+1) FIFOs. In the preferred embodiment each respective address stored in each shift register 51 to 53 is 4 bits long, and is referred to as a nibble, as previously described. These addresses are applied via lines 54 to 56 to two header byte generators 59, 60, implemented by tri-state bus drivers. Header generator 60 also receives via line 61 a four bit nibble from the common sequence generator 24. In the preferred embodiment the common sequence generator 24 is implemented as a counter whose count is incremented after each scan, that is, each time after data has been written into all transmit FIFOs 22a to 22m in sequence, in response to a control signal on line 32 from a transmit FIFO counter 83 shown in FIG. 2C. Each header byte generator drives the data bus 34 at an appropriate time in response to a control signal PTR1, PTR2 on lines 62, 64, applied by the input control 20 shown in FIG. 2C, prior to the transfer of data from the temporary FIFO 28 to a next-in line transmit FIFO 22a to 22m.

With further reference to FIG. 2C, a read decoder 42 provided in the input control 20 receives a read enable signal on line 70 from the state machine 45 and responsively applies a read signal via lines 65a to 65n to one of input FIFOs 18a to 18n or to the dummy FIFO 17. The correct read signal is selected via select lines 54 from the register 51 of FIG. 2B, which outputs the previously described PRS+2 input FIFO address on queue.

When a half-full flag (HF) is detected in any input channel FIFO 18a to 18n on any of the lines 46a to 46n, the 62 byte long data packet from the corresponding input FIFO is written into the temporary FIFO 28, shown in FIG. 2B, via the data bus 74, in response to the above-mentioned read enable signals and a write clock signal on line 36a from the input control 20. The temporary FIFO 28 continuously holds three data packets which are read therefrom sequentially in response to a read clock applied thereto from input control 20 on line 66a. Each data packet from FIFO 28 is applied via latch 73 to a different transmit FIFO 22a to 22m shown in FIG. 2D in sequence, along with the header information from the header byte generators 59, 60. In response to write clock signals applied on lines 68a to 68m from a write decoder 44 shown in FIG. 2C, to the respective transmit FIFOs 22a to 22m, the data packets from the temporary FIFO 28 are transmitted sequentially to the transmit FIFOs 22a to 22m via the data bus 34. As it has been mentioned previously, each data packet is preceded by two bytes of pointer information applied from the header byte generators 59, 60. The contents of the header byte generators are read in response to a read enable signal applied via lines 62, 64 from input control 20.

A dummy-retransmit generator 85 shown in FIG. 2B is utilized to reset via line 48 the dummy FIFO 17 read pointer to the top of the stored information in the FIFO. This is done at the end of a data packet transfer if the last packet address was zero, which in the preferred embodiment corresponds to the dummy FIFO 17 address. The retransmit is needed so that the feed forward information may be read repeatedly from the dummy FIFO 17 during operation.

As it is shown in FIG. 2A, in the data path from the input FIFOs 18a to 18n to the temporary FIFO 28 via bus 30 there is coupled a latch 72. Similarly, in FIG. 2D a latch 73 is coupled in the data path via bus 34 between the temporary FIFO 28 and transmit FIFOs 22a to 22m. These respective latches serve to extend the setup time for accepting data from these latches by the particular FIFOs utilized in the preferred embodiment. The data transfer rate to these FIFOs is thereby optimized for a maximum transfer rate.

The system clock generator 35 shown in FIG. 2C generates a system clock signal on line 39 for the multiplexer portion 1 of FIG. 1. In addition, it generates a FIFO write timing clock on line 57 and a FIFO read timing clock on line 58.

The byte counter 81 of FIG. 2C counts the 62 bytes which are being transfered during each packet transfer from the input FIFOs 18a to 18n to the temporary FIFO 28 and the 64 bytes which are being transferred during each packet transfer from the temporary FIFO 28 and from the pointer que 26 to one of the transmit FIFOs 22a to 22m. It is enabled via line 79 from the state machine 45 and the byte count complete signal therefrom is received by the state machine via line 50.

The transmit FIFO counter 83 of FIG. 2C determines the next in line transmit FIFO 22a to 22m, and it is incremented by one, via line 87, from the state machine 45, every time after a packet has been transferred to one of the transmit FIFOs. Via line 69 it receives a preset number m which is equal to the number of transmit FIFOs.

The operation of the input control 20 of the preferred embodiment, related to a data packet transfer from an input FIFO 18a to 18n to a transmit FIFO 22a to 22m will now be described with reference to the flow chart shown in FIG. 3, depicting a control program stored in a ROM (not shown), included in the state machine 45 of FIG. 2C. After system initialization, the program tests whether the transmit FIFO 22a is less than half-full, as it is indicated by block 78, by testing the status of the control signal THF1 on line 43 from the scan equalizer 29 of FIG. 2D. If it is more than half-full, a wait state is effected as shown by block 80, until a less than half-full status is detected. Thereafter, as indicated by block 82, the header byte generator 60 of FIG. 2B is enabled via line 64, as well as the byte counter 81 shown in FIG. 2C, via line 79, in preparation for the next data packet transfer from the temporary FIFO 28 to a transmit FIFO 22a to 22m. After a one clock cycle delay caused by latch 73, the header byte generator 59 of FIG. 2B is enabled via line 62, as well as the write decoder 44 via line 71, and the previously enabled header byte generator 60 is disabled via line 64 as it is shown by block 84. It is noted that the respective steps indicated by blocks 82 and 84 have to be performed in separate consecutive steps because of the delay caused by latch 73, shown in FIG. 2D, as previously described. As depicted by block 86, the header byte generator 59 is disabled via line 62, the read decoder 42 is enabled via line 70, and the read clock on line 66a to the temporary FIFO 28 read clock is enabled. Block 88 shows that the write clock on line 36a to the temporary FIFO 28 is enabled in preparation for entering therein the next data packet from one of the input FIFOs 18a to 18n on queue. It is noted that the above described respective operations depicted by the respective blocks 86, 88 have to be performed during separate consecutive steps with respect to the delay introduced by the latch 72, shown in FIG. 2A, as previously described. Block 90 tests the count on line 50 from the byte counter 81 of FIG. 2C, to determine whether the data packet transfer is nearly finished. The following block 92 introduces a wait state into the operation until a predetermined byte count, for example 63, is detected.

As it is shown by the following block 94, during the next step the byte counter 81 is disabled via line 79, together with the read enable signal on line 70 to the read decoder 42 and the read clock on line 66a to the temporary FIFO 28. At the same time the content of the pointer queue 26 of FIG. 2B is advanced or shifted by one register in response to a control signal on line 37 from the state machine 45 of FIG. 2C. According to the last block 96 of the flow chart of FIG. 3, the write enable signal on line 71 to the write decoder 44 and the write clock on line 36a to the temporary FIFO 28 are disabled. In addition, the address in the transmit FIFO counter 83 is incremented by one via line 87, in preparation for receiving the next data packet from the temporary FIFO 28. It is noted that the respective operations indicated by blocks 94, 96 are being performed as separate steps because of the previously indicated delay caused by latch 72 and 73. The operation depicted by the above-described flow chart is then repeated for the next data packet transfer.

In the following a more detailed description of the demultiplexer portion 3 of FIG. 1 will be given, with reference to the detailed block diagrams of FIGS. 4A to 9B. With further reference to FIG. 4A, it shows the previously described S/P converters 152a to 152m which receive the serial channel data at the parallel clock rate, which is reproduced by the tape recording-/reproducing device 106 of FIG. 1, on parallel synchronous channels 150a to 150m. In response to a register clock signal applied on line 151 from the input sequencer 188, the data is transferred from each S/P converter to a respective receive FIFO 156a to 156m. The data from the receive FIFOs is applied to the data bus 160 in response to respective read clock signals on lines 217a to 217m from read decoder 262 shown in FIG. 5.

The common sequence detector 162 shown in FIG. 4B comprises a common sequence counter 263 which loads an initial common sequence count upon receiving an output byte from receive FIFO 156a via the data bus 160 and a control signal on line 202 from a data packet transfer controller 275 shown in FIG. 5. After the initial count has been loaded, the counter 263 increments every time in response to a control signal on line 202 from the controller 275. The circuit 162 also has a register 258 into which the first byte of the present packet is being read from 156b to 156m. As it has been described previously, that first byte contains the common sequence number which is loaded in response to a control signal on line 203 from the controller 275. The common sequence number on line 259 from the counter 263 and on line 260 from the register 258 are compared by a common sequence comparator 264 and the result of the comparison is applied on line 211 as a common sequence error (CSE). The CSE signal on line 211 indicates an error if three consecutive non-comparisons were obtained in the comparator 264.

The pointer queue detector 164 shown in FIG. 4B comprises registers 267 to 269, a majority vote detector 270 and a TAG queue FIFO 271. The pointer queue detector 164 receives via the data bus 160 three reproduced pointer queue nibbles. The first nibble is received during the first packet byte read from one of the receive FIFOs 156a to 156m and the remaining two nibbles are received during the second byte read. The remaining 62 bytes of the packet are data, as it has been previously described. The PRES+2 pointer is delayed by two packet transfer cycles by the registers 267 and 268, and the PRES+1 pointer is delayed by register 269 by one packet transfer cycle. Consequently, when the PRS pointer arrives on data bus 160, that is during the first packet byte read, the delayed redundant pointers are aligned with the present pointer PRS at the respective inputs of the majority vote detector 270. The voting correlator compares corresponding bit locations of all three simultaneously received pointer queue nibbles and votes on the majority of the compared bits to determine to which output channel the present data packet at FIFO 166 output belongs. The output from the voting correlator on line 111 is the resulted voted on output channel address. In the preferred embodiment the voting correlator tolerates one error in each nibble bit position. This address redundancy and comparison provide for error tolerance in the output channel determination. The voted address on line 111 is applied to the TAG queue FIFO 271 which holds the addresses of the packets—written in the temporary FIFO 166 on FIG. 4B. The first address number from the TAG queue FIFO 271 on line 277 corresponds to the first packet of 62 bytes of data being output from the temporary FIFO 166 to one of the output FIFOs 176a to 176n. That TAG number is applied on line 277, to a select input of a write decoder 261 shown in FIG. 5, which in response to a read/write (R/W) enable signal on line 210 from the controller 275 applies a write enable signal on one of the lines 216a to 216n to the selected output FIFO, or on line 283 to dummy FIFO 174.

The scan equalizer 192 shown in FIG. 4B receives a half full flag status signal HF1 via line 272 from the receive FIFO 156a and HF2 via line 273 from the temporary FIFO 166, and it provides metering control signals SEHF1 on line 212 and SEHF2 on line 214, which are utilized to equalize the scan transfer intervals. Signal SEHF1 on line 212 is applied to the data packet transfer controller 275 of FIG. 5, and the signal SEHF2 on line 214 to data output sequence (DOS) controller 276 of FIG. 5, as it will be further described in more detail.

The preferred embodiment of the data output transfer control circuit 190 of FIG. 1 is shown in FIG. 5 as having a packet transfer controller 275 and a data output sequence (DOS) controller 276, implemented by two state machines. It will be understood that alternatively just one state machine combining both operations may be utilized. The controller 275 receives the previously described control signals SEHF1 on line 212, and CSE on line 211 from FIG. 4B and it provides control signals necessary to control the transfer of data from the receive FIFOs 152a to 152m to the temporary FIFO 166, as it will be described in more detail with reference to the flow chart of FIGS. 6A and 6B. To the controller 275 there are also connected a modulus 62 byte-counter 279 and a modulus 8 channel counter 280, whose respective operations are similar to those of the previously described counters 81 and 83 shown in FIG. 2C, and will be described with respect to the flow chart.

A read decoder 262 is utilized to apply read clock signals on lines 217a to 217m to the receive FIFOs 156a to 156m of FIG. 4A, in response to a select word on line 281 from counter 280 and a read enable signal on line 209 from the controller 275.

A clock circuit 284 shown in FIG. 5 provides a synchronous system clock on line 218 for distribution to all the transfer circuits shown and two reference clocks used by the VCO calibrators 356 of FIG. 9A.

The DOS controller 276 of FIG. 5 receives a DOS enable control signal on line 201 from the controller 275, an output ready (OR) on line 213 from the TAG queue FIFO 271 of FIG. 4B and SEHF2 signal on line 214 from FIG. 4B. The controller 276 provides control signals necessary for the transfer of data from the temporary FIFO 166 to the output FIFOs 172a to 172n and to the dummy FIFO 174. The operation of the DOS controller will be described in more detail with reference to the flow chart of FIG. 7. Before the DOS controller 276 begins its operation, it waits for the temporary FIFO 166, to become half full as indicated by the HF flag on line 273. For the FIFO 166 to become half full, 9 packets of data have to be written therein. These 9 packets of data have their corresponding output channel addresses stored in the TAG queue FIFO 271. The DOS controller 276 checks the output ready (OR) line 213 from the TAG queue FIFO 271 which becomes true after that FIFO has received the first address. Thus the controller 276 verifies that the OR signal is true and that the temporary FIFO 166 is over half full. At that point in time the transfer from the temporary FIFO 166 to the output FIFOs 176a to 176n and the dummy FIFO 174 begins. As it has been previously described, the half full status flags on lines 272, 273 are retimed by the scan equalizer 192 which applies scan equalized output signals on lines 212, 214, corresponding to these flags, at equally spaced intervals during the one scan interval.

A 62 byte-counter 282, which is similar to the previously described counter 279, is connected to the controller 276. A write decoder 261 shown in FIG. 5 receives a write enable control signal on line 210 from the DOS controller 276 and the previously described TAG address on line 277 from the TAG queue FIFO 271 of FIG. 4B. It applies in response to these control signals respective write clock signals on lines 216a to 216n to the output FIFOs 176a to 176n and on line 283 to the a dummy FIFO 174.

The operation of the packet transfer controller 275 of FIG. 5 will now be described with reference to the flow chart depicted in consecutive FIGS. 6A and 6B. After system initialization, block 302 indicates testing the scan equalized control signal SEHF1 on line 212. If FIFO 156a is less than half full, a wait state is introduced as shown by block 304, until a more than half full status is detected. Thereafter, as indicated by block 306, the DOS controller 276 of FIG. 5 is enabled via line 201 and the operation of the DMA controller starts, as it will be described further with reference to the flow chart of FIG. 7. Thereafter as it is shown by block 308, a load signal on line 206 is applied to the majority vote detector 270 of FIG. 4B, which then loads simultaneously the three nibbles to be compared, as previously described. At the same time a control signal on line 202 is applied to initialize the common sequence counter 263 with the first common sequence number loaded from the receive FIFO 156a, or, after it has been initialized, to increment its count by one at the beginning of the next scan. Further, a read enable control signal on line 209 is applied to the read decoder 262 to enable the read clock signals on lines 217a to 217m to the receive FIFOs 156a to 156m of FIG. 4A. As a next step, block 310 further shows that the signal on line 209 disables the read decoder 262, and a further signal on line 204 is applied to load the TAG queue FIFO 271 of FIG. 4B with the latest address vote as previously described.

Block 312 tests whether there is an error signal CSE indicated on line 211 from the common sequence detector 162 of FIG. 4B. If there is an error, the DOS controller 276 of FIG. 5 is reset by the controller 275 via line 219 and disabled via line 201 for reinitialization. The DOS controller 276 then returns to START upon reset. If there is no error indicated on line 211, respective load signals are applied via lines 207 and 208 to the registers 267 to 269 of the pointer queue detector 164 shown in FIG. 4B. In addition, a control signal is applied via line 209 to enable the read decoder 262. Block 318 tests the output from counter 279 on line 240, shown in FIG. 5, whether it finished counting. If not, lines 205 and 209 are enabled and counter 279 is enabled via line 242 and incremented via line 218, as it is indicated by block 320. When counting by counter 279 is finished, the counter 280 of FIG. 5 is incremented via line 243, to increment the reading from the next receive FIFO. Block 324 tests the status of the signal SEHF1 on line 212 from the scan equalizer of FIG. 4B, whether the receive FIFO 156a is more than half full. If not, it waits for the scan equalized half full status, as indicated by block 326. If yes, the following block 328 further tests the status of the signal on line 241 from the counter 280 of FIG. 5, whether it finished counting all m receive FIFOs, that is 8 receive FIFOs in the preferred embodiment. If not, the routine continues as shown by block 307 in FIG. 6A, according to which a load control signal is applied on line 206 to the majority vote detector 270 of FIG. 4B, and a read enable signal on line 209 is applied to the read decoder 262 of FIG. 5, similarly as it has been previously described with reference to block 308 of FIG. 6A. In addition, block 307 shows that a load signal on line 203 is applied to the register 258 for the next common sequence number to be applied on line 260 to the common sequence comparator 264 for comparison with the common sequence number on line 259. Thereafter the flow chart continues by the previously described block 310.

Now the flow chart of FIG. 7 will be described, depicting the operation of the DOS controller 276 of FIG. 5. The operation is started by the control signal on line 201 from the data packet transfer controller 275 of FIG. 5, as shown by the block 306 of FIG. 6A. With further reference to block 330 of FIG. 7, it tests whether the temporary FIFO 166 of FIG. 5 is more than half full, by testing the status of the SEHF2 signal on line 214 from the scan equalizer 192 of FIG. 4B. If not, a wait state is introduced, as shown by block 331. If yes, lines 215 and 244 are enabled, as it is shown by block 332. Line 215 causes the TAG queue FIFO 271 to output the address of the output FIFO indicating the destination of the next data packet applied from the temporary FIFO 166 and the signal on line 244 loads the counter 282 with the initial count number.

As it is further depicted by block 334, lines 245 and 210 are enabled. The signal on line 245 enables the counter 282 to be incremented by the system clock 218 and the signal on line 210 enables the temporary FIFO 166 read clock and the output FIFOs write clocks as previously described. The following block 336 tests the status on line 246 whether the counter 282 finished counting. If not, the routine returns to the previously described block 334. If yes, the routine returns to the START of the flow chart of FIG. 7.

FIG. 8 shows the combined feed forward distributor 194 and dummy RAM 174 circuits of FIG. 1 in a block diagram form, and particularly, the signals received thereby, and distributed therefrom to the respective FLL circuits 180a to 180n associated with each output channel. This combined circuit receives the previously described TAP and DAC feed forward information which is transmitted from the dummy FIFO 17 of FIG. 2B in a dummy data packet. The circuit disassembles and distributes that information, and provides redundant error detection of the received data to assure that the corresponding data related to the asynchronous output clock rate received by the output channels is correct. Thus it prevents data which may be erroneous due to defects in the transmission channel or dropouts in the recording medium from being applied to the output channels. As it has been previously described, the respective data bytes which form the data packet in the dummy FIFO pertain to different output channels, and the locations of these data bytes within the data packet correspond to the respective output channel locations. In response to a previously described write clock signal on line 283 from the write decoder of FIG. 5, a data packet on bus 170 is written to the dummy RAM 174. After the dummy RAM has received a packet of data, which contains the TAP and DAC information as it has been described earlier, the feed forward distributor filters out erroneous data so it will not be transferred to the output channels. The channel addresses associated with the data bytes contained in the RAM 174 are compared to addresses generated by an address counter. If the first two addresses compare with the address counter, then the circuit will continue in operation. If there is no comparison, the further operation by the circuit 174, 194 stops. If the received dummy data packet information containing the DAC and TAP numbers for a particular output channel is the same in two consecutive data packets, while it also differs from the previously transferred values, that information will be transferred from the circuit 174, 194 as the correct information to that particular channel. The following output signals provided by the block 174, 194 are distributed to all the FLL output channel circuits 180a to 180n. The DAC information is applied on the DAC bus 379, the TAP information on the TAP bus 381, the address information on the address bus 383, and the TAP and DAC enable control signals on lines 382 and 380, respectively. These control signals enable each particular FLL circuit for loading information from the corresponding bus into an address decoder and register 350, provided in each FLL circuit 180a to 180n, as it is shown in FIG. 9 and will be described below.

FIG. 9 shows a preferred embodiment of a frequency locked loop (FLL) and parallel-to-serial (P/S) circuit 180n, corresponding to that of FIG. 1. It utilizes the previously described feed forward information values DAC and TAP to regenerate the asynchronous output clock frequency for each channel. Because similar FLL and P/S circuits are utilized for each of the n output channels 182a to 182n, only one such circuit 180n will be described in detail. The previously described DAC and TAP values are applied from the feed forward distributor 194 of FIG. 8 via a DAC bus 379 and and TAP bus 381, respectively, to an address decoder and register 350. These respective buses are common to all channels. The address decoder/register further receives from the distributor 194 a DAC enable and a TAP enable signal via lines 380, 382, respectively, an output channel address via address bus 383 and a preprogrammed channel address identification number on line 384, corresponding to that particular channel. The decoder/register 350 compares the addresses on lines 383 and 384, and if they agree, the DAC and TAP information on buses 379 and 381 is written into the registers in 350 in response to the control signals on lines 380, 382. The address decoder/register 350 also internally compares the present and the last TAP number, and if there is a difference, a FIFO control and emulator 362 receives a control signal via line 397 therefrom and will start a new loop initialization process, as it will be described later. Such a change in the TAP numbers indicates that the user clock changed rate during the operation of multiplexing and a new initialization is therefore necessary during demultiplexing.

The DAC number on line 385 from the decoder/register 350 is summed in a digital summer 352 with a loop error term, which is a binary number including sign and magnitude of a loop error number on line 396 from a loop integrator 374. The loop error term is used to cancel any error which may be contained in the feed forward frequency information. It is applied as a negative feedback signal to the summer 352. The digital sum from the summer 352 on line 387 is applied to a D/A converter, which multiplies it by a signal on line 363 and provides a DC control voltage, which in turn is used to control a VCO included in an automatically calibrated precision VCO circuit 356. The voltage on line 388 determines the output frequency of the VCO. The circuit 356 automatically calibrates itself to a high degree of accuracy when the channel is not operating to output user clock information. By such calibration a desired precise transfer function characteristic at the VCO output is obtained. The calibrated VCO circuit 356 outputs a gain compensation signal on line 345 which is added or subtracted from a voltage reference 368, which represents a loop gain constant for the system, to offset any tolerance variations in the VCO hardware. Thereby a high accuracy of the conversion of DAC numbers to a VCO output frequency is obtained for a wide range of clock rates, as it will become apparent from further description. The signals on lines 345, 348 are summed in an analog summer with a negative feedback signal on line 349 from a half full position feedback signal normalizing circuit 370.

The circuit 370 receives a half full status indication from the output FIFO 176n via line 398. That negative feedback is dominant when the whole loop is operating near a steady state response. It provides an instantaneous normalized damping feedback signal which forces the VCO to change frequency a fixed percentage of the output rate in such a way as to force the FIFO 176n data contents towards the half full position. During calibration of the VCO the calibration circuit 356 sends a CAL control signal via line 346 to the half full position feedback circuit 370 which forces a null output from 370, to the loop integrator 374 and to the address decoder/registers 350. The CAL signal sets the output from integrator 374 on line 396 to a value which indicates zero error. The CAL signal on line 346 causes the DAC output value from the decoder/registers to be a specific number which is used for the calibration. Frequency reference lines FREF1 and FREF2 on lines 221, 222 request setting of two such reference numbers.

The actual user clock for that particular output channel on line 184n is obtained as it will be described below. The output signal from the VCO on line 389 is applied as a clock signal to a prescaler 358, which is implemented by a cascade of divide by two dividers. The prescaler divides the VCO output signal by 2, 4, 8, 16 and other divisions by 2 to the power of n. The output lines from the prescaler 358, corresponding to these divisions are applied to a multiplexer 360. In response to a TAP select line 366 from the address decoder/registers 350 the multiplexer selects one prescaled output clock rate and applies it as the user output clock rate on line 184n for that output channel. Thus with reference to the foregoing description, a portion of the feed forward information represented by the DAC word on line 385 sets the VCO to a specific operation frequency, and the TAP word portion of the feed forward information on line 366 selects a particular prescaled range of that operating frequency, which is then used as the reconstructed user clock rate. The error term in the loop compensates for the VCO frequency, by increasing or decreasing that frequency, depending on the half full status of the output FIFO 176n, as indicated by the half full flag line 398. The purpose of the above compensation is to servo, that is maintain the output FIFO near its half full status on the average, and thereby prevent it from becoming empty or full with data any time during the operation, thus preventing output data bit slips.

Now the operation of the FIFO control and emulator 362 will be described. It provides write and read signals on lines 391, 392 to the output FIFO 176n and monitors the number of data packets that have been written to and read from the FIFO, that is, it keeps track of the number of data bytes present in the output FIFO. When the FIFO control and emulator 362 receives a write select enable signal WRSELn on line 216n from output control 190 of FIG. 5 for that particular channel as previously described, it enables via line 391 writing of data into FIFO 176n from the temporary FIFO 166 of FIG. 4B via the data bus 170. That data is written into the output FIFO 176n. The data from that FIFO is read out continuously via parallel lines 393 in 8-bit byte form to the P/S converter 366. The reading out is enabled by line 392 from the FIFO control and emulator 362 at a read clock rate which is ⅛ of the actual user output clock rate. The P/S register clock R loads the data into an internal register at the end of the read from the output FIFO 176n. The serial clock Fs on line 184n, which is the feed forward output clock rate, also referred to as user clock, is shifting that parallel data out from the P/S 366 serially on output line 186n. The feed forward output frequency on line 184n equals $$Fs = \frac{Fvcomax}{2^{Nd}} * \frac{NDAC}{2^{NTAP}} \ [bps] \quad (5)$$

In case the reproduce parallel clock rate differs from the parallel clock rate utilized during recording, for example due to a different tape speed at reproduction, the user clock rate would be scaled as follows:

$$Fs = \frac{Frp}{Frec} * Fn[bps] \quad (6)$$

where
Frec is the parallel clock rate on line 105 used during recording;
Fn is the user input clock rate on lines 12a to 12n.

The playback tape speed information is applied from the reading/reproducing device 106 of FIG. 1 on line 6 to the output controller 190 and therefrom to the feed forward distributor 194. The data stored in the dummy RAM 174 contains the recording tape speed information. The feed forward distributor 194 compares the record and playback tape speed information and in case they differ, it adjusts the TAP value to obtain a scaled Fs value as defined by equation (6).

The half full flag HF on line 398 provides half-full feedback to the emulator and if necessary the emulator 362 resets itself to the half full state and thereby corrects for any inaccuracies of the actual number of data packets present in the output FIFO which may have been mis-registered during emulation. The emulator 362 provides two loop bandwidth clocks, also referred to as adaptive loop bandwidth clocks, and applies one of these clocks on line 100 to the loop integrator 374, as follows. When the emulator knows that the data in the output FIFO 176n is near the half full point, for example within plus or minus ¼ of the total memory therefrom, it applies an overdamped bandwidth clock on line 100. When the FIFO is closer to becoming full or empty, for example more than ¾ full or less than ¼ full, the emulator changes the bandwidth clock on line 100 to a critically damped rate, which provides faster loop response, having an optimum settling time, without overshoot. On the other hand, the overdamped response slows down the loop response to errors, that is, the VCO frequency will change slower in response to any errors regarding the FIFO contents and the feed forward provides the major control. Thus the FIFO control and emulator 362 decides on the basis of the fullness of the output FIFO which bandwidth to utilize.

The loop integrator 374 is preferably implemented as a 12 bit up/down counter with deadband, where the lower four bits are not used, which receives the half full flag HF on line 398 from the output FIFO 176n, and in response thereto, it increases or decreases the output signal frequency from the VCO frequency, and when more than half full status is indicated, the integrator counts up to increase the clock frequency. It follows from the foregoing description that the presently described loop is a "bang-bang" type servo loop which servoes the half full point of the output FIFO 176n. The adaptive loop bandwidth clock on line 100 determines the clock rate at which the up/down counter of the integrator counts. That clock rate represents the loop bandwidth, which tracks the user clock rate. The actual loop bandwidth is a function of the user clock. In the preferred embodiment, for example at a user data rate of 124 kbps with a packet rate of 250 Hz the loop bandwidth is 25 Hz, that is 1/10 of the packet rate. For a data rate of 9.92 MHz and a packet rate of 20 KHz the loop bandwidth is 2 KHz, which again is 1/10 of the data packet rate. In the preferred embodiment the critically damped frequency is 1/10 of the data packet rate and the overdamped frequency is 1/40 of the packet rate for any user clock frequency. Thus the loop itself adjusts its bandwidth according to the user clock rate and the degree of FIFO fullness and therefore a critically damped or overdamped loop can be used which provides a fast capture time during start up and a low jitter output rate during normal servoing.

As it has been previously mentioned with reference to the operation of the address decoder and registers 350, when it detects a change in the TAP number received on bus 381, it forces via a control line 397 the FIFO control and emulator 362 into a startup mode and prevents reading of the data from the output FIFO 176n if it is less than half full until it is at least half full or reads the data from the FIFO at a high rate if it is over half full until it becomes half full. The frequency locked loop is then closed, data is read from the output FIFO at the feed forward rate, plus the VCO output frequency is servoed to provide an appropriate output clock which will maintain the output FIFO half full on the average.

The foregoing features of the system of the invention enable it to obtain a frequency locked loop which can operate over a wide frequency range, for example in the preferred embodiment over a range 40,000 to 1.

What is claimed is:

1. A system for synchronous transmission of digital data received on a plurality of input channels at asynchronous rates, and for distribution of the synchronously transmitted data to a plurality of output channels at respective asynchronous rates derived from said input data rates, comprising:

plurality of input storage means, each coupled to one input channel for receiving and storing said input data at said asynchronous rates;

means for measuring, encoding, and storing information related to the asynchronous data rate on each input channel;

first intermediate storage means having an input coupled to respective outputs of all input storage means, and coupled to receive said stored asynchronous rate related data from all input channels;

input control means for controlling transfer of data from each said input storage means to said intermediate storage means at a rate corresponding to said respective input data rates and to control transfer of said stored asynchronous rate related data to said intermediate storage means, said input control means being coupled to generate for each input data an associated output channel address information derived from each respective input channel address;

transmit storage means;

said input control means being coupled to control transfer of data stored in said intermediate storage means and of said associated output channel address information to said transmit storage means and to control synchronous transmission therefrom on a synchronous transmission channel at a synchronous data rate;

receive storage means coupled to receive said transmitted data and associated output channel address information from said synchronous transmission channel at said synchronous data rate;

second intermediate storage means having an input coupled to receive said data and said associated output channel address information from said receive storage means;

plurality of output storage means, each having an input coupled to an output of said second intermediate storage means and having an output coupled to a particular output channel;

output control means for controlling transfer of data from said second intermediate storage means to said respective output storage means designated by said associated output channel address information; and means coupled to said second intermediate storage means for receiving and storing said encoded transmitted asynchronous rate related data for each input channel and for controlling the rate of transmission of said data from each said output storage means to said particular output channel at a rate substantially corresponding to said asynchronous rate related data for that particular output channel.

2. The system of claim 1 wherein each said input storage means is a sequential storage means for storing and outputting said input data in a sequence in which it is received from each said input channel, each input storage means is coupled to provide a first control signal respectively indicating a predetermined level of fullness thereof, and wherein said input control means is coupled to detect said first control signal and to initiate responsively transfer of data from said input storage means to said intermediate storage means.

3. The system of claim 2 wherein said input control means is coupled to cyclically monitor said predetermined level of fullness of all input storage means and to transfer data from each said input storage means to said first intermediate storage means in the order of detecting said predetermined level of fullness of said respective input storage means.

4. The system of claim 3 wherein said input control means is coupled to generate said output channel address associated with each said data transferred to said intermediate storage means, said intermediate storage means further comprising an address storage means coupled to said input control means to receive therefrom and store said output channel addresses associated with said data stored in said intermediate storage means.

5. The system of claim 4 wherein said input control means is coupled to control transfer of each said data from said intermediate storage means, and of said associated output channel address from said address storage means, to said transmit storage means.

6. The system of claim 4 wherein said intermediate storage means is a sequential storage means for storing said data in a sequence in which it is received from each said input storage means, said transmit storage means is coupled to provide a second control signal indicating a predetermined level of fullness thereof, and said input control means is coupled to initiate said transfer of data and said associated output channel address information from said intermediate storage means to said transmit storage means in response to said second control signal.

7. The system of claim 6 wherein a plurality of said transmit storage means is utilized, each having an output coupled to an input of one said synchronous transmission channel, and wherein said input control means is coupled to control said transfer of data and said associated output channel address information from said intermediate storage means to each of said transmit storage means in a predetermined sequence in response to said second control signal.

8. The system of claim 7 further comprising an output sequence control means coupled to apply a synchronizing output signal to said plurality of transmit storage means, said transmit storage means being coupled to synchronously transmit therefrom said data and associated output channel address information to all said synchronous transmission channels in response to said synchronizing control signal.

9. The system of claim 7 wherein a plurality of said receive storage means is utilized, each having an input coupled to an output of one said transmission channel, further comprising an input sequence control means coupled to control a synchronous transfer of said transmitted data and associated output channel address information from each said transmission channel to one said receive storage means.

10. The system of claim 1, wherein said means for measuring, encoding, and storing information related to the asynchronous data rate on each input channel is coupled to count a number of reference clock pulses occurring during a predetermined number of input channel clock cycles to obtain said asynchronous data rate for each input channel.

11. The system of claim 10 wherein each said output channel comprises a frequency locked loop coupled to provide an output signal frequency for trasnferring said data from each said output storage means to a particular output channel at a rate substantially corresponding to said asynchronous rate, and wherein said means for measuring, encoding and storing is further coupled to encode said asynchronous data rate for each input channel into a coarse and a fine adjustment value for adjusting said output signal frequency provided by said frequency locked loop.

12. The system of claim 11 wherein each said frequency locked loop further comprises a voltage controlled oscillator means having a control input coupled to receive said fine adjustment value for adjusting responsively an output signal frequency therefrom; and output frequency prescaler means having an input coupled to an output of said voltage controlled oscillator means, and wherein said coarse adjustment value is coupled to select one said prescaled output signal frequency value from said prescaler means.

13. The system of claim 12 wherein said frequency locked loop further comprises:

loop integrator means coupled to receive a signal indicating a predetermined level of fullness of said output storage means, and to provide responsively a loop error signal as a negative feedback signal value having a magnitude and sign proportional to a fullness of said output storage means relative to said predetermined level of fullness; and summing means coupled to receive said fine adjustment value and said negative feedback value, and to apply a sum of said received values to said control input of the voltage controlled oscillator means.

14. The system of claim 11 wherein said frequency locked loop further comprises:

voltage controlled oscillator means having a control input coupled to receive said encoded fine adjustment value as a control signal for adjusting said output signal frequency thereof;

prescaler means coupled to receive an output signal from said voltage controlled oscillator means and to divide said frequency thereof by selected integral number coefficients to obtain a plurality of prescaled output signal frequencies; and multiplexer means having a plurality of inputs, each coupled to receive one said prescaled output signal frequency, and a control input coupled to receive said encoded coarse adjustment value, to select responsively one said prescaled output signal frequency from said multiplexer means.

15. The system of claim 1 wherein said receive storage means is a sequential storage means for storing said input data in a sequence in which it is received from said synchronous transmission channel, said receive storage means being coupled to provide a third control signal indicating a predetermined level of fullness thereof, and wherein said output control means is further coupled to detect said third control signal and initiate responsively transfer of said data and associated output channel address information from said receive storage means to said second intermediate storage means.

16. The system of claim 1 wherein said means for receiving and storing said encoded transmitted asynchronous rate related data comprises:

first means coupled to said second intermediate storage means to receive and store said transmitted asynchronous rate related data for said respective output channels;

a plurality of frequency locked loops, each coupled to a respective output channel to generate an output clock signal for applying said data stored in said output sotrage means to said particular output channel at said rate substantially corresponding to said asynchronous rate related data; and second means coupled to said first means for receiving and applying said asynchronous rate related data stored therein to a respective frequency locked loop coupled to that particular output channel.

17. The system of claim 16 wherein each said frequency locked loop comprises:

address decoder and register means coupled to said second means to receive therefrom and store said asynchronous rate related data associated with an address designating that particular output channel;

loop integrator means coupled to receive a fourth control signal from said output storage means coupled to said particular output channel, said fourth control signal indicating a predetermined level of fullness of said output storage means, said loop integrator means being coupled to provide a loop error signal having a magnitude and sign proportional to a level of fullness relative to said predetermined level;

voltage controlled oscillator means coupled to receive a fifth control signal for adjusting an output signal frequency therefrom; and summing means coupled to receive said asynchronous rate related data from said address decoder and register means and said loop error signal, to provide a sum of said respective signals and to apply said sum as said fifth control signal to said voltage controlled oscilaltor means.

18. The system of claim 16 wherein said means for measuring, encoding and storing information is coupled to encode said asynchronous data rate for each input channel into a coarse and a fine adjustment value, and wherein said frequency locked loop coupled to a particular output channel comprises:

address decoder and register means coupled to said second means to receive therefrom and store said coarse and fine adjustment values for that particular output channel;

loop integrator means coupled to receive a fourth control signal from said output storage means coupled to said particular output channel, said fourth control signal indicating a predetermined level of fullness of said output storage means, said loop integrator means coupled to provide a loop error signal having a magnitude and sign proportional to a level of fullness relative to said predetermined level;

voltage controlled oscillator means coupled to receive a fifth control signal for controlling an output signal frequency providied thereby;

summing means coupled to receive said fine adjustment value from said address decoder and register means and said loop error signal, to provide a sum of said respective signals, and to apply said sum as said fifth control signal for controlling said output signal frequency provided by said oscillator means;

digital-to-analog converter means coupled to receive said fine adjustment value from said address decoder and register means and to convert said value to an analog signal;

prescaler means coupled to receive said output signal from said voltage controlled oscillator means and to divide said frequency of said signal by selected integral number coefficients to obtain a plurality of prescaled output signal frequencies; and multiplexer means having a plurality of inputs, each coupled to receive one said prescaled output signal frequency, and a control input coupled to receive said coarse adjustment value form said address decoder and register means, to select responsively one said prescaled output signal frequency from said multiplexer means.

19. The system of claim 18 further comprising:
output storage control and emulator means coupled to receive said output signal from said multiplexer means, and said fourth control signal from said output storage means indicating said predetermined level of fullness, to monitor the amount of data present in said output storage means, and to enable responsively writing of data into and reading of data from said output storage means, respectively.

20. The system of claim 19 wherein said loop integrator means comprises an up/down counter means, and said output storage control and emulator means is further coupled to generate a clock signal applied to said counter means, said clock signal having a frequency dependent on said level of fullness of said output storage means monitored by said output storage control and emulator means.

21. The system of claim 20 wherein said output storage control and emulator means is coupled to provide a clock signal having a first frequency in response to said monitored data being within a known limit of said predetermined level of fullness, and to provide a clock signal having a second, higher frequency in response to said monitored data being outside said known limit.

22. A system for receiving data on a plurality of input channels at asynchronous data rates, transmitting said received data at a synchronous data rate, and applying said transmitted data to a plurality of output channels at asynchronous data rates substantially corresponding to said input data rates, comprising:

a plurality of first in-first out (FIFO) storage means, each coupling to an input channel for receiving and storing data at said asynchronous rates, each said first FIFO storage means being coupled to provide a first control signal indicating a predetermined level of fullness thereof, respectively;

second FIFO storage means having an input coupled to the respective output of said first FIFO storage means;

a plurality of third FIFO storage means, each having an input coupled to an output of said second FIFO storage means, and each having an output coupled to an input of a synchronous transmission channel, a selected one of said third FIFO storage means being coupled to provide a second control signal indicating a predetermined level of fullness thereof;

a plurality of fourth FIFO storage means, each having an input coupled to an output of one said synchronous transmission channel, a selected one of said fourth FIFO storage means being coupled to provide a third control signal indicating a predetermined level of fullness thereof;

fifth FIFO storage means having an input coupled to respective outputs of said fourth FIFO storage means;

a plurality of sixth FIFO storage means each having an input coupled to an output of said fifth FIFO storage means, and each having an output coupled to one said output channel, each said sixth FIFO storage means being coupled to provide a fourth control signal, respectively, indicating a predetermined level of fullness thereof;

means for measuring, encoding and storing information related to the asynchronous data rate on said respective input channels;

input control means coupled to detect said first control signals and to control responsively transfer of said data from said first to said second FIFO storage means and associated output channel address information in the order of detection, said input control means being further coupled to transfer said stored asynchronous data rate related information to said second FIFO storage means, to detect said second control signal and to control responsively a sequential transfer of said data, associated address and said encoded asynchronous data rate related information from said second to said plurality of third FIFO storage means;

means coupled to control synchronous transfer of said data, associated address, and said encoded asynchronous data rate related information from said plurality of third FIFO storage means to said plurality of synchronous transmission channels;

output control means coupled to detect said third control signal and to control responsively a sequential transfer of said synchronously transmitted data, associated address and said encoded asynchronous data rate related information received by said plurality of fourth FIFO storage means to said fifth FIFO storage means, said output control means being further coupled to detect said fourth control signals and to control responsively transfer of said data from said fifth to said sixth FIFO storage means designated by said output channel address information associated with said data; and means coupled to said fifth FIFO storage means for receiving therefrom and storing said encoded asynchronous data rate related information, and for controlling the rate of transmission of said data from each said sixth FIFO storage means to said respective output channel coupled thereto at a rate substantially corresponding to said stored encoded asynchronous data rate related information pertaining to that particular output channel.

* * * * *

UNITED STATES PATENT AND TRADEMARK OFFICE
CERTIFICATE OF CORRECTION

PATENT NO. : 4,759,014

DATED : July 19, 1988

INVENTOR(S) : David G. Decker, et al.

It is certified that error appears in the above-identified patent and that said Letters Patent is hereby corrected as shown below:

Column 22, Line 55 after "rate" insert --, and to encode and store said asynchronous data rate--.

Signed and Sealed this

Eighteenth Day of August, 1992

Attest:

DOUGLAS B. COMER

*Attesting Officer*     *Acting Commissioner of Patents and Trademarks*